(12) United States Patent
Yamauchi et al.

(10) Patent No.: US 6,964,610 B2
(45) Date of Patent: Nov. 15, 2005

(54) VIDEO GAME DEVICE, TECHNIQUE SETTING METHOD IN VIDEO GAME, AND COMPUTER READABLE RECORDING MEDIUM STORING TECHNIQUE SETTING PROGRAM

(75) Inventors: Madoka Yamauchi, Toyonaka (JP); Katsuma Kashiwagi, Akashi (JP); Kazuhiro Hiruo, Katano (JP)

(73) Assignee: Konami Corporation, Tokyo (JP)

( * ) Notice: Subject to any disclaimer, the term of this patent is extended or adjusted under 35 U.S.C. 154(b) by 19 days.

(21) Appl. No.: 09/761,275

(22) Filed: Jan. 16, 2001

(65) Prior Publication Data

US 2001/0008844 A1 Jul. 19, 2001

(30) Foreign Application Priority Data

Jan. 19, 2000 (JP) ........................................ 2000-011069

(51) Int. Cl.[7] .................................................. A63F 9/22
(52) U.S. Cl. .................................. 463/23; 463/1; 463/7
(58) Field of Search ................................ 463/1–4, 7, 8, 463/23, 36–38, 6, 43–45; 273/108, 108.1, 108.2, 317.1–317.6, 459–461; 345/683, 636; 473/131, 151, 409; 116/222–225, 290, 321, 322; 340/69.3

(56) References Cited

U.S. PATENT DOCUMENTS

| 5,317,505 | A | | 5/1994 | Karabed et al. |
| 5,649,861 | A | | 7/1997 | Okano et al. |
| 5,947,819 | A | | 9/1999 | Ohshima |
| 6,066,046 | A | | 5/2000 | Yamamoto |
| 6,117,014 | A | | 9/2000 | Aoyama et al. |
| 6,149,523 | A | * | 11/2000 | Yamada et al. ............... 463/31 |
| 6,184,899 | B1 | | 2/2001 | Akemann |
| 6,280,323 | B1 | | 8/2001 | Yamazaki et al. |

(Continued)

FOREIGN PATENT DOCUMENTS

| EP | 0 830 881 | 3/1998 |
| EP | 0830881 | 3/1998 |
| EP | 0 917 897 | 5/1999 |
| EP | 0917897 | 5/1999 |
| JP | 9-024161 | 1/1997 |
| JP | 10-137443 | 5/1998 |
| JP | 11-151382 | 6/1999 |
| JP | 11-156054 | 6/1999 |
| JP | 2000-024314 | 1/2000 |
| JP | 2001-009150 | 1/2001 |
| JP | 2001-224859 | 8/2001 |
| JP | 2001-259220 | 9/2001 |
| WO | 97/32642 | 9/1997 |
| WO | WO 97/32642 | 9/1997 |

OTHER PUBLICATIONS

Nagano Winter Olympics '98 Manual, downloaded from Internet on Oct. 4, 2002 <http://www.cheatcc.com/psx/-manuals/-nagano.txt> pp. 1–10.*

Nagano Winter Olympics '98, downloaded from Internet on Oct. 4, 2002 <http://www.n64cc.com/-/reviews/revnag.htm> pp. 1–4.*

(Continued)

*Primary Examiner*—Jessica Harrison
*Assistant Examiner*—Jason Skaarup
(74) *Attorney, Agent, or Firm*—Jordan and Hamburg LLP

(57) ABSTRACT

A video game device allows a game player to set a degree of difficulty of a technique to be performed by a play character by continuously hitting a pair of buttons in a controller. A command guiding unit guides the input of a command which causes the play character to perform a technique corresponding to the set degree of difficulty, and a stick-shaped controller allows the game player to input commands in accordance with the guide given by the command guiding unit. Upon completion of the performance of the technique by the play character, an evaluating unit evaluates the technique performed in accordance with the commands inputted by the game player.

27 Claims, 21 Drawing Sheets

U.S. PATENT DOCUMENTS

| | | |
|---|---|---|
| 6,322,448 B1 | 11/2001 | Kaku et al. |
| 6,354,940 B1 | 3/2002 | Itou et al. |
| 6,394,897 B1 | 5/2002 | Togami |
| 6,604,008 B2 | 8/2003 | Chudley et al. |
| 6,679,776 B1 | 1/2004 | Nishiumi et al. |
| 6,699,127 B1 | 3/2004 | Lobb et al. |
| 6,702,677 B1 | 3/2004 | Fujisawa et al. |
| 6,746,331 B1 | 6/2004 | Saikawa et al. |
| 2001/0008397 A1 | 7/2001 | Komata |
| 2001/0008844 A1 | 7/2001 | Yamauchi et al. |

OTHER PUBLICATIONS

Nagano Winter Olympics '98, downloaded from Internet on Oct. 4, 2002 <http://www.ign64.ign.com/−articles/152/152259pl.html>to pp. 1–5.*

Links 386 CD Players Manual, Access Software, Inc., 1995, pp. 23, 33, 42, 75.*

"Hyper Olympic Games in Nagano Official Guide" p. 96–99, published on Dec. 18, 1997 by Konami Corporation.

Perry, Douglas C.: Jonny Moseley Mad Trix: The first radical skiing game is in development and 3DO is at the helm. Nov. 29, 2001. http://ps2.ign.com/articles/136/136648p1.html., 5pp.

Instructions: California Games, circa 1991, http://skyscraper.fortunecity.com/dos/209/lynxwld/manuals/california_games.htm., 8 pp.

Jung, Robert: California Games: The classic Epyx computer game arrive on Lynx. The full review. Jul. 6, 1999, http://gameboy.ign.com/articles/155/155859p1.html., 3pp.

"The Adrenaline Vault Review of SSX," web article. EA Sports, publisher. M. Laidlaw, reviewer. Published Dec. 1, 2000. Available http://www.avault.com/consoles/reviews/ps2/print_review.asp?game=ssx. Printed May 14, 2001, 5pp.

SSX Playstation 2 Game Review in Absolute Playsation 2 (PS2)—SSX web article. EA Sports, Developer. Available http://www.absolute−playstation.com/ssx/ssx_review.htm. Printed May 14, 2001, 6pp.

"Hyper Olympic Games in Nagano Official Guide" pp. 96–99, published on Dec. 18, 1997 by Konami Corporation.

Nagano Winter Olympics '98 Manual, downloaded from Internet on Oct. 4, 2002 <http://www.cheatec.com/psx/−manuals/−nagano.txt> pp. 1–10.

Nagano Winter Olympics '98, downloaded from Internet on Oct. 4, 2002 <http://www.n64cc.com−/reviews/revnag.htm>pp. 1–4.

Nagano Winter Olympics '98, downloaded from Internet on Oct. 4, 2002 <http://www.ign64.ign.com/−articles/152/152259pl.html> pp. 1–5.

Links 386 CD Players Manual, Access Software, Inc., 1995, pp. 23, 33, 42, 75.

* cited by examiner

VIDEO GAME DEVICE, TECHNIQUE SETTING METHOD IN VIDEO GAME, AND COMPUTER READABLE RECORDING MEDIUM STORING TECHNIQUE SETTING PROGRAM

The present invention relates to a video game device using an optical disk, a magnetic disk, a semiconductor memory or a cassette-type storage medium storing program data, a technique setting method for setting techniques in a video game and a computer readable recording medium storing a technique setting program.

BACKGROUND OF THE INVENTION AND RELATED ART STATEMENT

A huge number of video game systems have been proposed. These systems include, for example, systems comprised of a special device for home use and a television monitor and systems comprised of a special device for business use, a personal computer or a workstation, a display and a sound output device. Any one of these systems includes a controller used by a game player for operation, a storage medium storing game program data, a CPU for executing controls to generate images and sounds based on the game program data, a processor for generating images, a processor for generating sounds, a CRT or like monitor for displaying images, and a loudspeaker for outputting sounds. CD-ROMs, semiconductor memories, cassette-type storage mediums having a built-in semiconductor memory are frequently used as the above storage medium.

As one kind of games executed by such game systems, it can be considered to simulate apparatus gymnastics such as the vaulting horse and the horizontal bar in a game space. Specifically, in an apparatus gymnastic game such as a vaulting horse game or a horizontal bar game, a play character who is a gymnast is caused to appear in the game space displayed on a monitor and perform a specific technique, an evaluation point is given to the play character depending on the degree of difficulty and degree of success of the technique performed, and ranking is determined based on the evaluation point.

In the gymnastic game as above, a plurality of techniques having different degrees of difficulty are prepared in advance. For example, the play character may be caused to perform a technique selected by operating an operable member such as a selection button based on an instruction displayed on a game screen. However, if a game can be proceeded by such a simple operation, it lacks ingenuity. Therefore, even if a game player is interested when he starts playing this game, he may get bored soon.

SUMMARY OF THE INVENTION

In view of the above situation, an object of the present invention is to provide a video game device capable of executing a highly interesting video game, a method for setting a technique in a video game and a computer readable recording medium storing a technique setting program.

In order to fulfill the above object, according to the present invention, a video game device for displaying a play character on a game screen displayed on a monitor and causing the play character to perform a plurality of techniques having different degrees of difficulty, comprises the following elements:

a degree of difficulty setting unit for setting a degree of difficulty of a technique to be performed by the play character, a command guiding unit for guiding an command input for causing the play character to perform a technique corresponding to the set degree of difficulty, an operation unit for causing the play character to perform the technique according to the set degree of difficulty, the operation unit including a first operable member for inputting the command in accordance with the command input guide given by the command guiding unit, and an evaluating unit for evaluating the technique performed in accordance with a command given by the first operable member.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
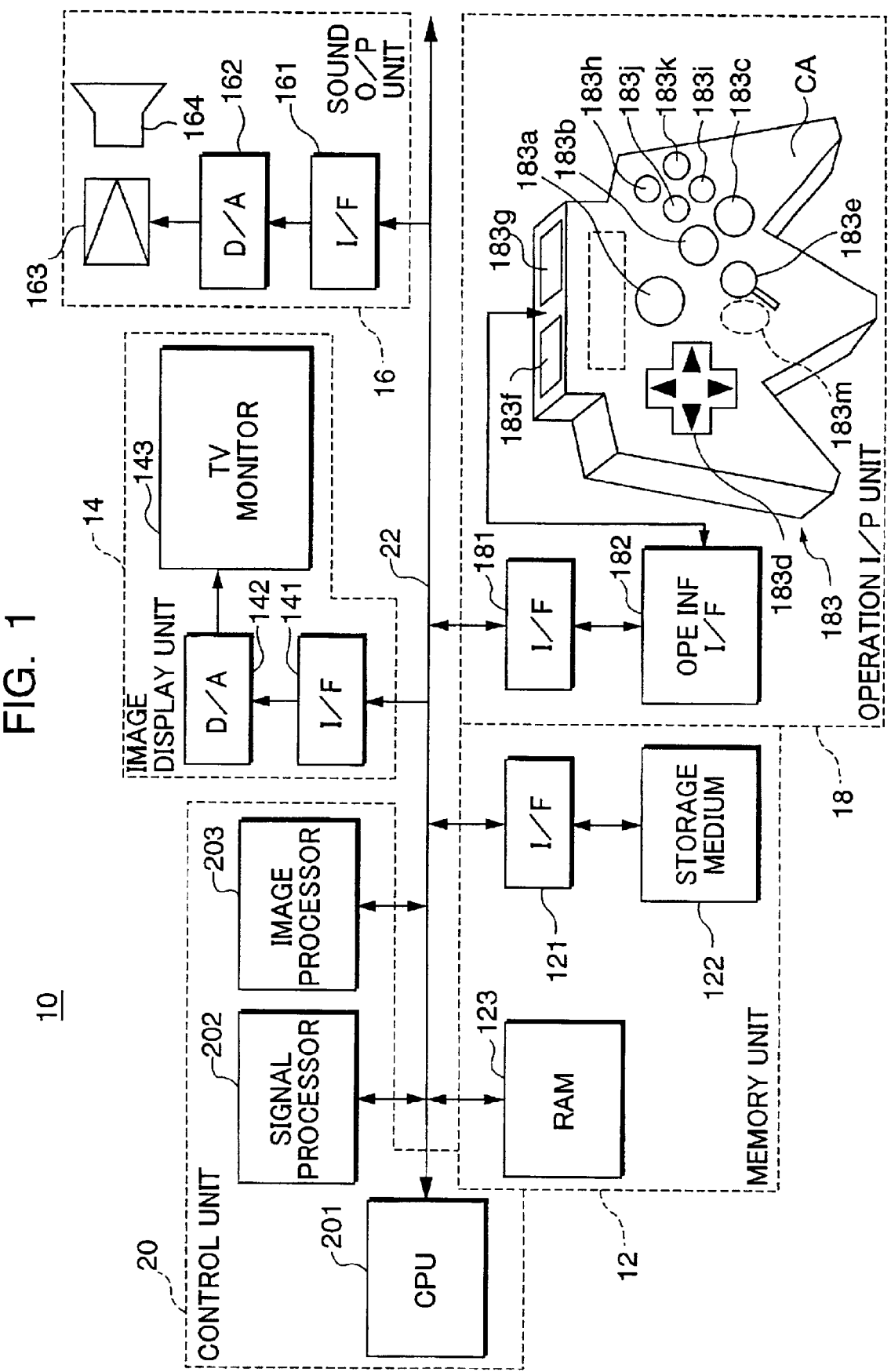
FIG. 1 is a construction diagram showing a video game system to which a technique setting method according to one embodiment of the present invention is applied.

FIG. 1 is a diagram showing the schematic construction of a video game system (video game device) 10 to which a technique setting method according to one embodiment of the present invention is applied. In FIG. 1, the video game system 10 is provided with a memory unit 12, an image display unit 14, a sound output unit 16, an operation input unit 18 and a control unit 20. The units 12, 14, 16 and 18 are connected with each other via a bus 22 including address buses, data buses and control buses connected with a CPU 201 of the control unit 20 to be described later.

In the memory unit 12 are stored game data comprised of image data, sound data and program data. The memory unit 12 includes a storage medium 122 connected with the bus 22 via an interface circuit 121 and a RAM 123 for temporarily storing the game data read from the storage medium 122. The storage medium 122 is, for example, a so-called ROM cassette in which a ROM or like storage medium storing game data and program data of an operating system is accommodated in a plastic casing, an optical disk, or a flexible disk.

The image display unit 14 is adapted to display various game images in accordance with the progress of the game and includes a digital-to-analog (D/A) converter 142 connected with the bus 22 via an interface circuit 141 and a television monitor (video monitor) 143 including a CRT, a liquid crystal display or the like connected with the D/A converter 142.

The sound output device 16 is adapted to output a game music, sound effects, etc. in accordance with the progress of the game and is provided with a D/A converter 162 connected with the bus 22 via an interface circuit 161, an amplifying circuit 163 connected with the D/A converter 162, and a loudspeaker 164 for outputting sounds in accordance with an output signal from the amplifying circuit 163.

The operation input unit 18 is adapted to output operation signals to the control unit 20 and is provided with an operational information interface circuit 182 connected with a bus 22 via an interface circuit 181, and a controller 183 connected with the operational information interface circuit 182. The controller 183 includes a start button 183a, an A-button 183b, a B-button 183c, a cross-shaped key 183d, a stick-shaped controller 183e, a C1-button 183h, a C2-button 183i, a C3-button 183j and a C4-button 183k provided on the front surface of a casing CA, a left trigger button 183f and a right trigger button 183g provided on the upper surface of the casing CA, and a Z-button 183m provided on the rear surface of the casing CA.

The stick-shaped controller 183e has substantially the same construction as a joystick. Specifically, the controller 183e has a standing stick (operation bar), which can be inclined to front, back, left, right or in any direction in a 360° range about a specified point of the stick as a supporting point. According to the direction and angle of inclination of the stick, an X-coordinate along transverse direction and a Y-direction along forward/backward direction in coordinate systems having the standing position of the stick as an origin are sent to the control unit 20 via the interface circuits 182 and 182.

The control unit 20 is adapted to control the progress of the game, and is comprised of the CPU 201 connected with the bus 22, a signal processor 202 and an image processor 203. The signal processor 202 mainly performs calculation of image data in a three-dimensional (3D) space, calculation for transforming a position in the 3D space to a position in a simulated 3D space, a light source calculation, and generation and processing of sound data. The image processor 203 writes an image data to be displayed in the RAM 123 based on the calculation results in the signal processor 202. For example, the image processor 202 writes a texture data in an area of the RAM 123 specified by a polygon.

The video game system 10 thus constructed takes different modes according to its application. Specifically, in the case that the video game system 10 is constructed for business use, all the elements shown in FIG. 1 are, for example, contained in one casing. In the case that the video game system 10 is constructed for home use, the television monitor 143, the amplifying circuit 163 and the loudspeaker 164 are separate from a main game unit.

Here, the main game unit is, for example, comprised of the interface circuit 121 connected with the CPU 201, the RAM 123, the interface circuit 141, the D/A converter 142, the interface circuit 161, the D/A converter 162, the interface circuit 181, the operational information interface circuit 182, the controller 183, the signal processor 202 and the image processor 203. This main game unit is constructed by accommodating the respective elements in a casing made of a synthetic resin, and the storage medium 122 is detachably mounted in a mounting portion formed in this casing. The controller 183 is connected with a connector provided in the casing via a communication cable or the like.

In the case that the video game system 10 is constructed with a personal computer or a workstation as a core, for example, the television monitor 143 corresponds a computer display, the image processor 203 corresponds to part of the game program data stored in the storage medium 122 or hardware on an extension board mounted on an extension slot of the computer, and the interface circuits 121, 141, 161, 181, the D/A converters 142, 162, and the operational information interface circuit 182 correspond to hardware on the extension board mounted on the extension slot of the computer.

A case where the video game system 10 is constructed for home use is described below.

Next, the operation of the video game system 10 is summarily described. First, when an unillustrated power switch is turned on to activate the video game system 10, the CPU 201 reads image data, sound data and game program data from the storage medium 122 in accordance with the operating system stored in the storage medium 122, and all or part of the read image data, sound data and game program data are stored in the RAM 123. Thereafter, a specified game is proceeded by the CPU 201 in accordance with the game program data stored in the RAM 123 and contents of instructions given by a game player via the controller 183.

Specifically, commands as tasks for forming images and outputting sounds are generated in accordance with contents of instructions given by a game player via the controller 183. The signal processor 202 performs calculation of display positions of characters in the 3D space (of course the same applies for a two-dimensional space), a light source calculation, generation and processing of sound data, etc. in accordance with these commands.

Data of images to be formed are written in the RAM 123 by the image processor 203 based on the calculation results. The image data written in the RAM 123 are fed to the D/A converter 142 via the interface circuit 141, and fed to the television monitor 143 after being converted into analog video signals in the D/A converter 142, thereby being displayed as game images on a display surface of the television monitor 143.

On the other hand, the sound data outputted from the signal processor 202 are fed to the D/A converter 162 via the interface circuit 161 and outputted as sounds from the loudspeaker 164 via the amplifying circuit 163 after being converted into analog sound signals in the D/A converter 162.

Next, contents of the game executed in the video game system 10 are summarily described. In this video game system 10, one game can be selected from a plurality of competition games by operating the start button 183a. Here, such an apparatus gymnastic game is executed that a play character which is a gymnast is caused to perform specified techniques using an apparatus such as a vaulting horse or a horizontal bar, and ranking is contended based on evaluation points given according to the degree of difficulty and the degree of success of the techniques performed.

This apparatus gymnastic game is played by one to four game players in this embodiment. As many play characters as the game players are caused to successively appear on the game screen image, the respective play characters perform specified techniques in turn, and ranking (victory) is contended based on the given evaluation points. For example, in the case of the vaulting horse, ranking is determined based on average points of the respective evaluation points obtained for two performances. In the case of the horizontal bar, ranking is determined based on total points of the respective evaluation points obtained for eight performances. In the memory unit 12 are stored score data of play characters who do not appear on the game screen. Ranking is determined for both the play characters who appear on the game screen and those who do not. Therefore, a single game player can also play this game.

Figure 2:
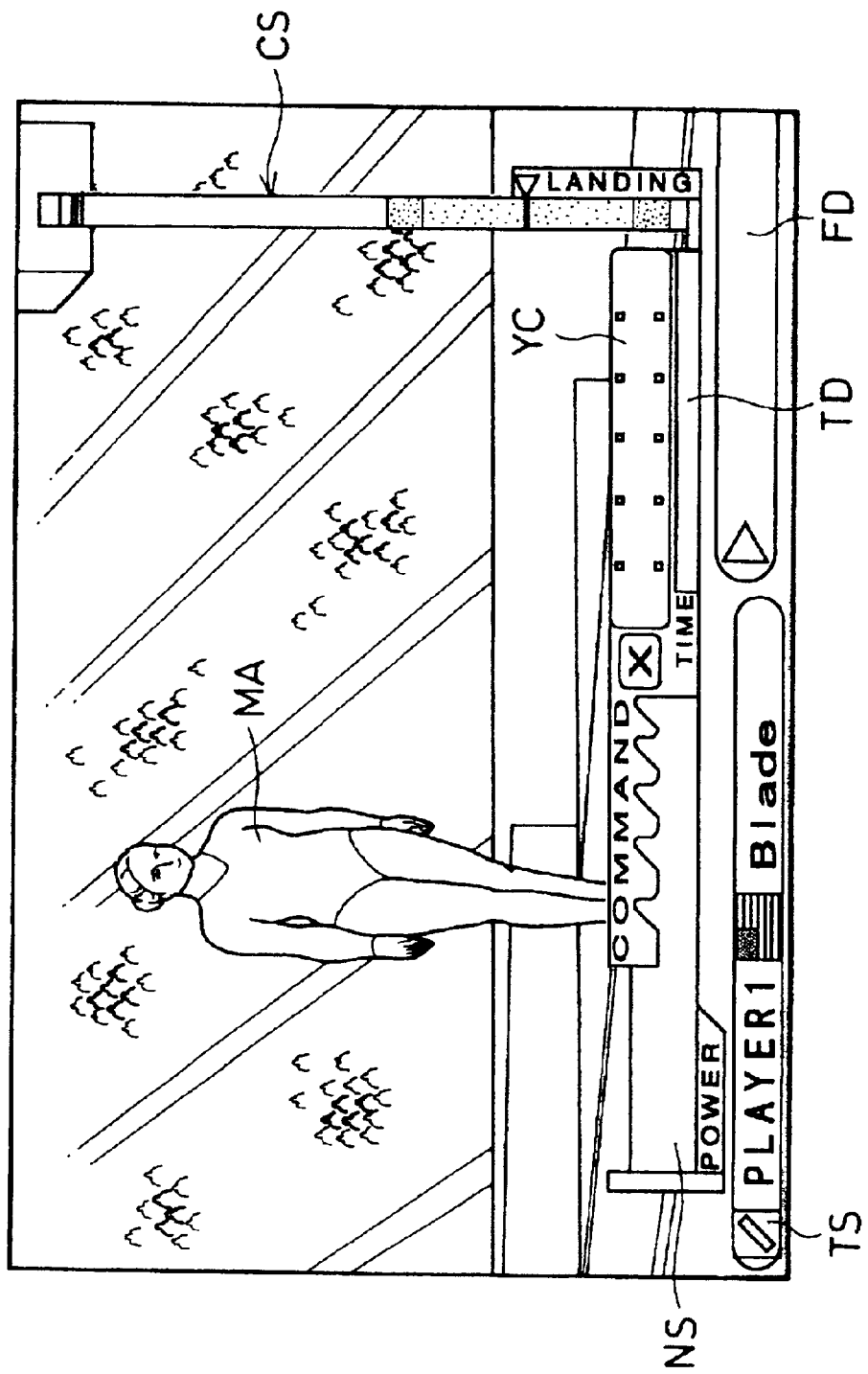
FIG. 2 is a diagram showing one game screen in the video game system shown in FIG. 1.

Next, a display example of the game screen in the case that a vaulting horse game is executed is described with reference to FIG. 2. The game screen shown in FIG. 2 shows one scene which comes up while the vaulting horse game is actually executed. Specifically, on this game screen, a play character MA which is a gymnast who started an approach run is displayed in the middle, a degree of difficulty setting section NS for setting a degree of difficulty of a technique to be performed by the play character MA is laterally displayed at the bottom left side, and a command input section YC is laterally displayed at the right side of the setting section NS. Below the command input section YC, a time display section TD for displaying a command input permitting time is laterally displayed in proximity to the command input section YC.

Further, a landing setting section CS for causing the play character MA to land upon the completion of the performance is vertically displayed at the right end of the game screen, and a player column TS for displaying an appearing order of the play character MA, a national flag of her nation and her name is set at the bottommost of the game screen. Here, "PLAYER1" which means a player who appears in the first place, the national flag of the USA and the name "Blade" of the play character MA are displayed.

A foul display column FD for displaying "FAUL" when the controller 183 is not operated for a predetermined time despite the fact that the game was already started is laterally displayed at the right side of the bottommost of the game screen. For example, "TIME10" is displayed in the foul display column FD when the controller 183 is not operated for a predetermined time, and the displayed numerical value is counted down every second and "FOUL" is displayed upon the lapse of 10 sec.

Figure 3:
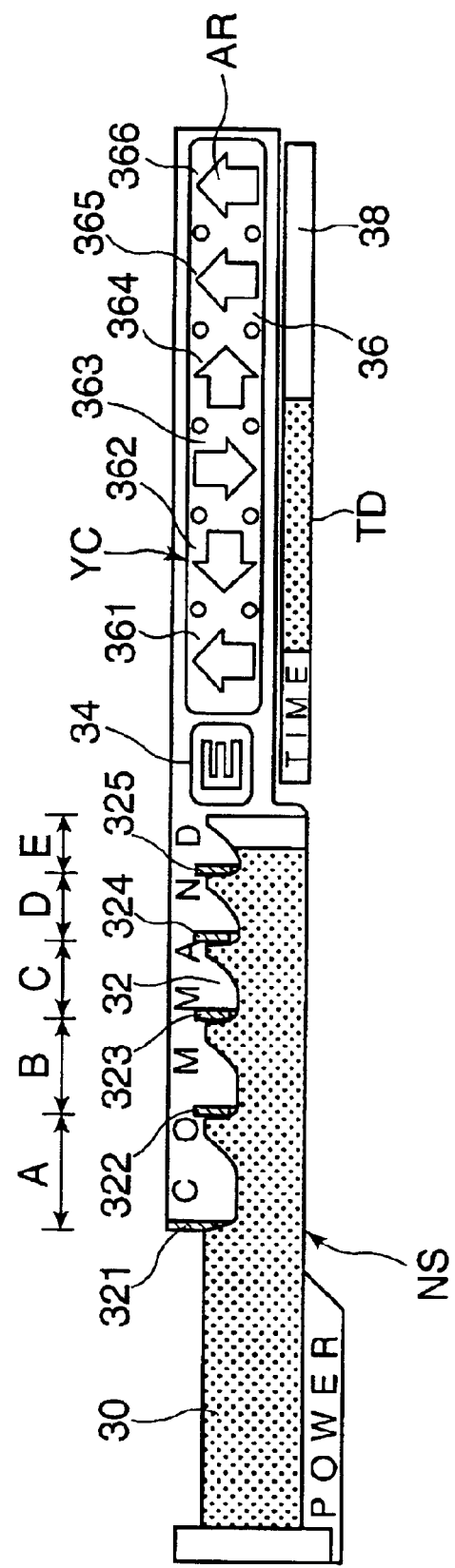
FIG. 3 is a diagram showing the construction of a degree of difficulty setting section, a command input section and a time display section in the video game system shown in FIG. 1.

FIG. 3 is a diagram showing the construction of the degree of difficulty setting section NS, the command input section YC and the time display section TD in detail in the vaulting horse game as shown in FIG. 2. The degree of difficulty setting section NS constructs a power gauge and is comprised of a strip-shaped power storing area 30 for displaying a technique power corresponding to the degree of difficulty, and a level display section 32 formed at the upper end of the right half of the power storing area 30 for discriminating the level of the stored technique power.

This technique power serves as an index (i.e. mark) indicating a degree of difficulty of a technique performed by the play character MA, and is increased (i.e. the mark enlarges in shape) when the game player alternately and continuously operates (continuously hits) two operable members of the controller 183 such as the C1-button 183*h* and the C2-button 183*i* on and off within a predetermined period. The more the operable members are operated to enhance the level of the stored technique power, the higher degree of difficulty the technique performed by the play character MA can have. In this way, the play character MA can have a higher evaluation point.

The level of the stored technique power is displayed by coloring the power storing area 30 in a chromatic color and increasing the colored area as the reached level is increased, and can be discriminated based on the position of the leading end of the colored area (the colored area is shown in dots). Specifically, the level display section 32 is constructed by a wave-shaped gauge having ridges and valleys, level marks 321, 322, 323, 324, 325 are given at the left end positions of the respective valleys, zones are set between adjacent level marks: A-zone between the level marks 321 and 322, B-zone between the level marks 322 and 323, C-zone between the level marks 323 and 324, D-zone between the level marks 324 and 325, and E-zone between the level mark 325 and a succeeding level mark. Widths of the respective zones are gradually narrower from the A-zone toward the E-zone.

A degree of difficulty A is set in the case that the leading end position of the colored area (indicated in dots in FIG. 3) is located in the A-zone; a degree of difficulty B is set in the case that it is located in the B-zone; a degree of difficulty C is set in the case that it is located in the C-zone; a degree of difficulty D is set in the case that it is located in the D-zone; and a degree of difficulty E is set in the case that it is located in the E-zone. Since the leading end position of the colored area is located in the E-zone in FIG. 3, the degree of difficulty E is set. The set degree of difficulty is also displayed in the form of A to E in the degree of difficulty setting section 34 provided adjacent to the right end of the power storing area 30. A mark "×" is displayed in the degree of difficulty display section 34 until the degree of difficulty is confirmed.

In this embodiment, the power storing area 30 is first colored in a cold color (e.g. blue), and the color tone changes toward a warm color (e.g. light red) as the stored technique power increases. In the already colored area as well, the color tone gradually changes toward a warm color (e.g. light red). When the entire power storing area 30 is colored (degree of difficulty E at this stage) and the technique power is further on the increase, the color tone of the power storing area 30 gradually changes toward scarlet from the right end toward the left end. In this state, a highest degree of difficulty F is set although it is not shown in the degree of difficulty display section 34, and the play character MA on an approach run makes a turn before reaching a springboard provided in front of the vaulting horse, so that a higher evaluation point is given.

The command input device YC is used to input a command to cause the play character MA to perform a technique corresponding to the degree of difficulty set in the degree of difficulty setting section NS. This command is given by a combination of six arrow icons AR facing to left, right, up or down. The command input section YC is provided with a command display area 36 having six icon display regions 361, 362, 363, 364, 365, 366. The arrow icons AR are not displayed in the respective icon display regions 361 to 366 of the command display area 36 while the degree of difficulty is not confirmed yet. A combination of the arrow icons AR facing some directions and corresponding to the degree of difficulty are displayed in a chromatic color (e.g. yellow) after the degree of difficulty is confirmed.

When the colored arrow icons AR (initial state) are displayed, the game player successively inclines the stick-shaped controller 183e (may be the cross-shaped key 183d) in the directions of the arrow icons AR from the one displayed in the first icon display region 361 to the one displayed in the last icon display region 366, thereby inputting a command. The directions of the arrow icons AR are set in such a combination that the operation of the controller 183a corresponds to the set degree of difficulty. For example, the higher the degree of difficulty, the more time is taken to input the command. This enables the operating ability of the game player to be reflected on the evaluation, thereby making the game more interesting.

The command input is set such that it must be performed within a predetermined period (e.g. about 5 sec.), the arrow icons AR in accordance with which the stick-shaped controller 183e has been inclined become achromatic (e.g. black) when the command input is completed, making the completion of the command input distinguishable. In other words, the displayed state of each arrow icon AR changes after the stick-shaped controller 183e is inclined, and has functions of urging the game player to input a command and guiding the command input before the stick-shaped controller 183e is inclined.

When the stick-shaped controller 183e is not inclined in the direction of the corresponding arrow icon AR, the input is invalidated to display a mark "×" on this arrow icon AR and give a warning sound, thereby notifying the game player that the command input was invalid. At this time, the game player cannot operate the stick-shaped controller 183e for the next arrow icon AR unless inclining the stick-shaped controller 183e in the right direction of the preceding arrow icon AR to which an erroneous operation was made.

The time display section TD is adapted to display a command input permitting time, and a remaining time display area 38 for displaying a remaining permitting time is set therein. The remaining time display area 38 is entirely colored in a chromatic color (e.g. yellow) when the arrow icons AR are displayed in the command input section YC, the colored range gradually decreases from the right end as the input permitting time decreases. The game player inputs the command while viewing the remaining time display area 38. In this embodiment, even for the same technique, the more the remaining permitting time (i.e. the shorter the command input completion time), the higher the evaluation point. This enables the operating ability of the game player to be reflected on the evaluation, thereby making the game more interesting.

Figure 4:
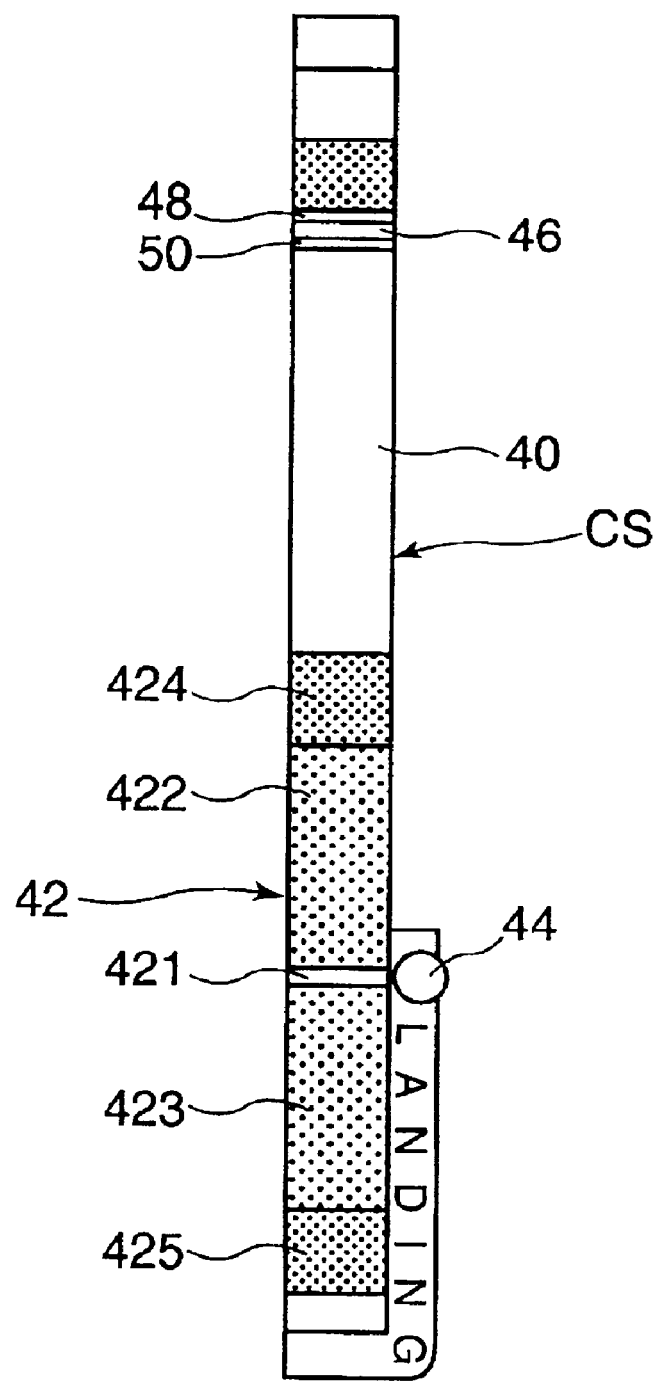
FIG. 4 is a diagram showing the construction of a landing setting section in the video game system shown in FIG. 1.

FIG. 4 is a diagram showing the construction of the landing setting section CS in detail. Specifically, the landing setting section CS forms a landing gauge and is provided with a landing setting display area 40 which is in the form of a strip extending along vertical direction. A landing success zone 42 is set in a specified position of the lower half of the landing setting display area 40. The landing success zone 42 is comprised of a first zone 421 fixed in a specified position and having a short vertical dimension, second zones 422, 423 provided above and below the first zone 421 and having a longer vertical dimension, and third zones 424, 425 provided outside the second zones 422, 423 and having a vertical dimension shorter than second zones 422, 423.

For example, the first zone 421 is displayed in yellow, the second zones 422, 423 are displayed in light orange, and the third zone 424, 425 are displayed in deep orange. At the right end of the first zone 421 is provided an emphasis mark 44 indicating the first zone 421 and displayed in red.

The first zone 421, the second zones 422, 423 and the third zones 424, 425 are adapted to display areas where landing is finished by such a posture to which the evaluation of the first place is given, where landing is finished by such a posture to which the evaluation of the second place is given, and where landing is finished by such a posture to which the evaluation of the third place is given, respectively. Although the vertical dimension of the first zone 421 is fixed, those of the second and third zones 422, 423, 424, 425 changes according to the set degree of difficulty.

Specifically, the vertical dimensions of the second and third zones 422, 423, 424, 425 become gradually narrower as the degree of difficulty gets higher from A toward E, and disappear when the entire power storing area 30 is chromatic and when the degree of difficulty F not indicated in the degree of difficulty display section 34 is set. In such a case, only the first zone 421 is displayed.

In the landing setting display area 40 is also displayed a landing mark 46 in the form of a line movable from the upper end position to the bottom end position. The landing mark 46 is displayed in, e.g. red and white lines 48, 50 are provided above and below it. The landing mark 46 is so displayed as to move at such a speed that it starts descending from the upper end position when the play character MA starts jumping from the vaulting horse and performing a technique in the air and reaches the bottom end position when landing is completed. The movement of the landing mark 46 is stopped by turning the Z-button 183 on. Thus, the game player can cause the play character MA to land by turning the Z-button 183m on to stop the play character MA within the landing success zone 42 while the play character MA is still performing a technique and the landing mark 46 is moving within the landing success zone 42.

When the landing mark 46 is so stopped as to coincide with the first zone 421, landing is finished in a most preferable posture and an evaluation of the first place is given. When the landing mark 46 is so stopped that the play character MA lands within the second zone 422 or 423, landing is finished in a more preferable posture and an evaluation of the second place is given. When the landing mark 46 is so stopped that the play character MA lands within the third zone 424 or 425, landing is finished in a preferable posture and an evaluation of the third place is given. The play character MA fails to land when the landing mark 46 is stopped outside the landing success zone 42, and this landing serves as minus points. This enables the operating ability of the game player to be reflected on the evaluation, thereby making the game more interesting.

Figure 5:
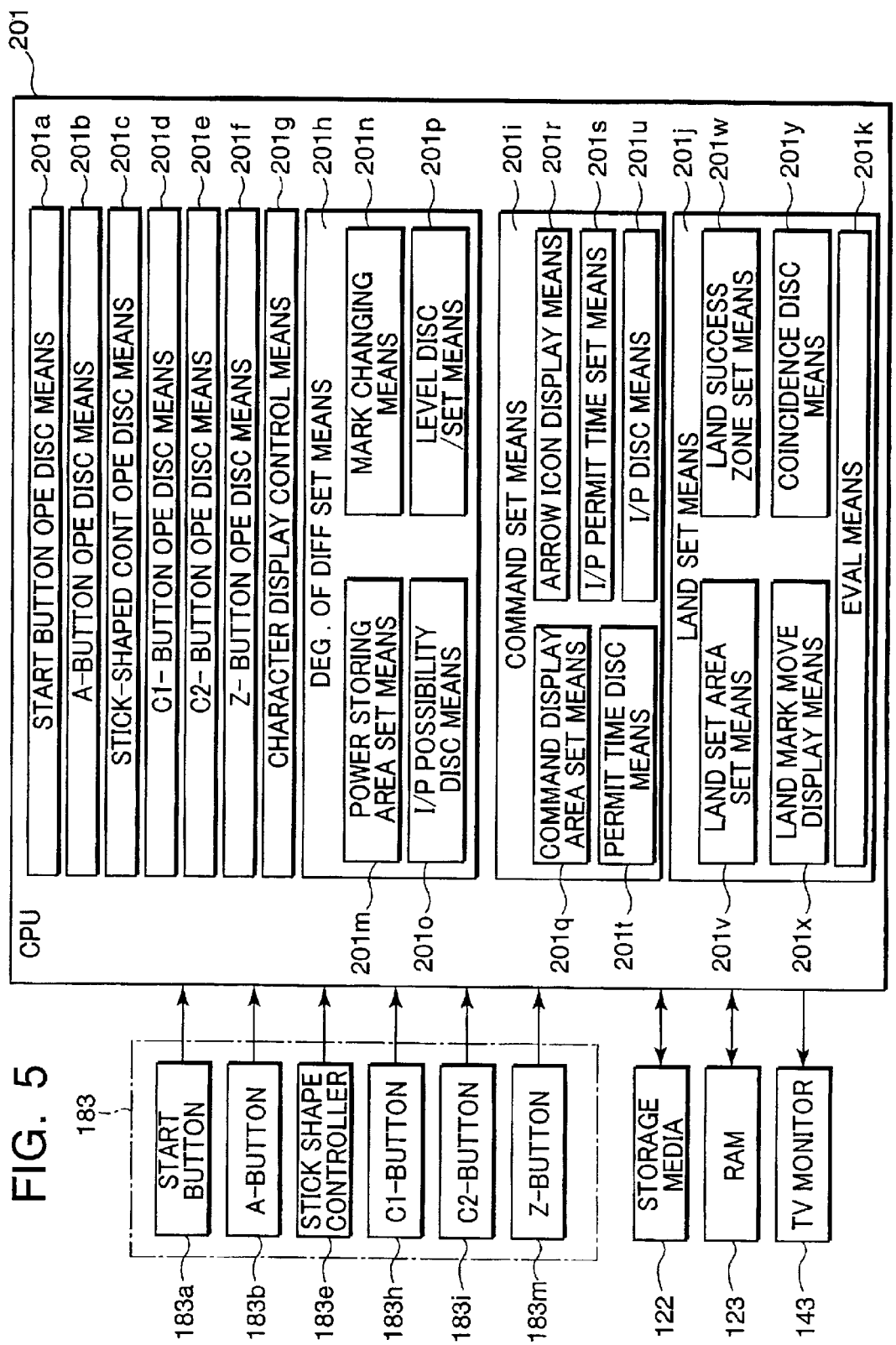
FIG. 5 is a block diagram showing functions of a CPU, a stick-shaped controller, various buttons and the like in the video game system shown in FIG. 1.

FIG. 5 is a block diagram showing function realizing unit of the CPU 201 in the case that the vaulting horse game is executed, the storage medium 122, the RAM 123, the television monitor 143 and the controller 183 (start-button 183a, A-button 183b, stick-shaped controller 183e, C1-button 183h, C2-button 183i and Z-button 183m). The interface circuits, buses, etc. are not shown in FIG. 5 in order to simplify the description.

Specifically, the CPU 201 is provided with the respective function realizing unit as a start button operation discriminating unit 201a, an A-button operation discriminating unit 201b, a stick-shaped controller operation discriminating unit 201c, a C1-button operation discriminating unit 201d, a C2-button operation discriminating unit 201e, a Z-button operation discriminating unit 201f, a character display control unit 201g, a degree of difficulty setting unit 201h, a command setting unit 201i, a landing setting unit 201j and an evaluating unit 201k.

The degree of difficulty setting unit 201h is provided with the respective function realizing unit as a power storing area setting unit 201m, a mark changing unit 201n, an input possibility discriminating unit 201o and a level discriminating/setting unit 201p. The command setting unit 201i is provided with the respective function realizing unit as a command display area setting unit 201q, an arrow icon display unit 201r, an input permitting time setting unit 201s, a lapse of permitting time discriminating unit 201t and an input discriminating unit 201u. The landing setting unit 201j is provided with the respective function realizing unit as a landing setting area setting unit 201v, a landing success zone setting unit 201w, a landing mark movement display unit 201x and a coincidence discriminating unit 201y.

The start button operation discriminating unit 201a discriminates whether the start button 182a has been turned on or off in accordance with an operation signal from the start button 183a. One game is selected from a plurality of games when the start button 183a is turned on. The A-button operation discriminating unit 201b discriminates whether the A-button 182b has been turned on or off in accordance with an operation signal from the A-button 183b. The start of the game is enabled when the A-button 183b is turned on.

The stick-shaped controller operation discriminating unit 201c discriminates whether the stick-shaped controller 183e has been inclined to specified four positions: to up, down, left and right which are set beforehand by rotating it while maximally inclined. The C1-button operation discriminating unit 201d discriminates whether the C1-button 182h has been turned on or off in accordance with an operation signal from the C1-button 183h. The C2-button operation discriminating unit 201e discriminates whether the C2-button 182i has been turned on or off in accordance with an operation signal from the C2-button 183i. In other words, every time the C1-button 183h and the C2-button 183i are alternately and continuously turned on/off, the technique power is stored, for example, by "1".

The Z-button operation discriminating unit 201f discriminates whether the Z-button 183m has been turned on or off in accordance with an operation signal from the Z-button 183m. When the Z-button 183m is turned on while the landing mark 46 is moving within the landing success zone 42, landing is set. The character display control unit 201g controls the display of the play character MA as the game progresses. A game screen corresponding to a game content is read from the RAM 123 and outputted to the television monitor 143.

The degree of difficulty setting unit 201h controls the display in the degree of difficulty setting section NS, and the power storing area setting unit 201m sets and displays the power storing area 30 in the specified position of the game screen. The mark changing unit 201n gradually increases the colored area of the power storing area 30 as the stored technique power is increased every time the C1-button 183h and the C2-button 183i are alternately and continuously turned on/off. The input possibility discriminating unit 201o discriminates whether the C1-button 183h and the C2-button 183i are in an input enabling state. The level discriminating/setting unit 201p discriminates which one of the A- to E-zones (see FIG. 3) in the level display section 32 the level of the stored technique power has reached, and the degree of difficulty of the technique to be performed by the play character MA is set based on this discrimination result.

The command setting unit 201i controls the display of the command input section YC, and the command display area setting unit 201q sets and displays the command display area 36 in the specified position of the game screen. The arrow icon display unit 201r sets and displays the arrow icons AR in their initial states in the command display area 36 when the degree of difficulty is set by the degree of difficulty setting unit 201h. In other words, the arrow icon display unit 201r constructs a command guiding unit since the arrow icons AR in their initial states have a function of guiding the game player to input the command.

The input permitting time setting unit 201s controls the display of the time display section TD and displays a remaining permitting time as the input permitting time decreases while displaying the remaining time display area 38. This remaining permitting time continues to be displayed until the performance of the technique by the play character MA is completed even after completion of the command input. The lapse of permitting time discriminating unit 201t discriminates whether the command input permitting time has already elapsed.

The input discriminating unit 201u discriminates whether the stick-shaped controller 183e has been successively inclined in the directions of the arrow icons AR and also discriminates whether the controller 183e has been precisely inclined in accordance with all the arrow icons AR within a predetermined period (e.g. about 5 sec.). Unless the controller 183e is inclined in the direction of the arrow icon AR, a mark "×" is displayed on this arrow icon AR and a warning sound is given. On the other hand, unless the inclining operation of the controller 183e has completed within the predetermined period, a landing failing operation is executed so as to cause the play character MA to land in an unstable posture or fall down during landing while the play character MA is caused to perform a technique having a set degree of difficulty.

The landing setting unit 201j controls the display of the landing setting section CS, and the landing setting area setting unit 201v sets and displays the landing setting display area 40 in the specified position of the game screen. The landing success zone setting unit 201w sets and displays the landing success zone 42 corresponding to the degree of difficulty set by the degree of difficulty setting unit 201h in the specified position of the landing setting display area 40.

The landing mark movement display unit 201x movingly displays the landing mark 46 in the landing setting display area 40, and the coincidence discriminating unit 201y discriminates whether the Z-button 183m has been turned on while the landing mark 46 is moving in any one of the first to third zones 421, 422, 423, 424, 425 within the landing success zone 42. If the Z-button 183m is turned on while the landing mark 46 is moving in any one of the zones, the coincidence discriminating unit 201y causes the play character MA to land in a manner corresponding to this zone.

The evaluating unit 201k gives an evaluation point to the technique performed by the play character MA. The evaluating unit 201k makes an evaluation based on the degree of difficulty of the technique set by the degree of difficulty setting unit 201h, the remaining permitting time for the command input in the command setting unit 201i, and the landing set by the landing setting unit 201j, etc., and gives an evaluation point set beforehand in correspondence with the evaluation made.

Figure 6:
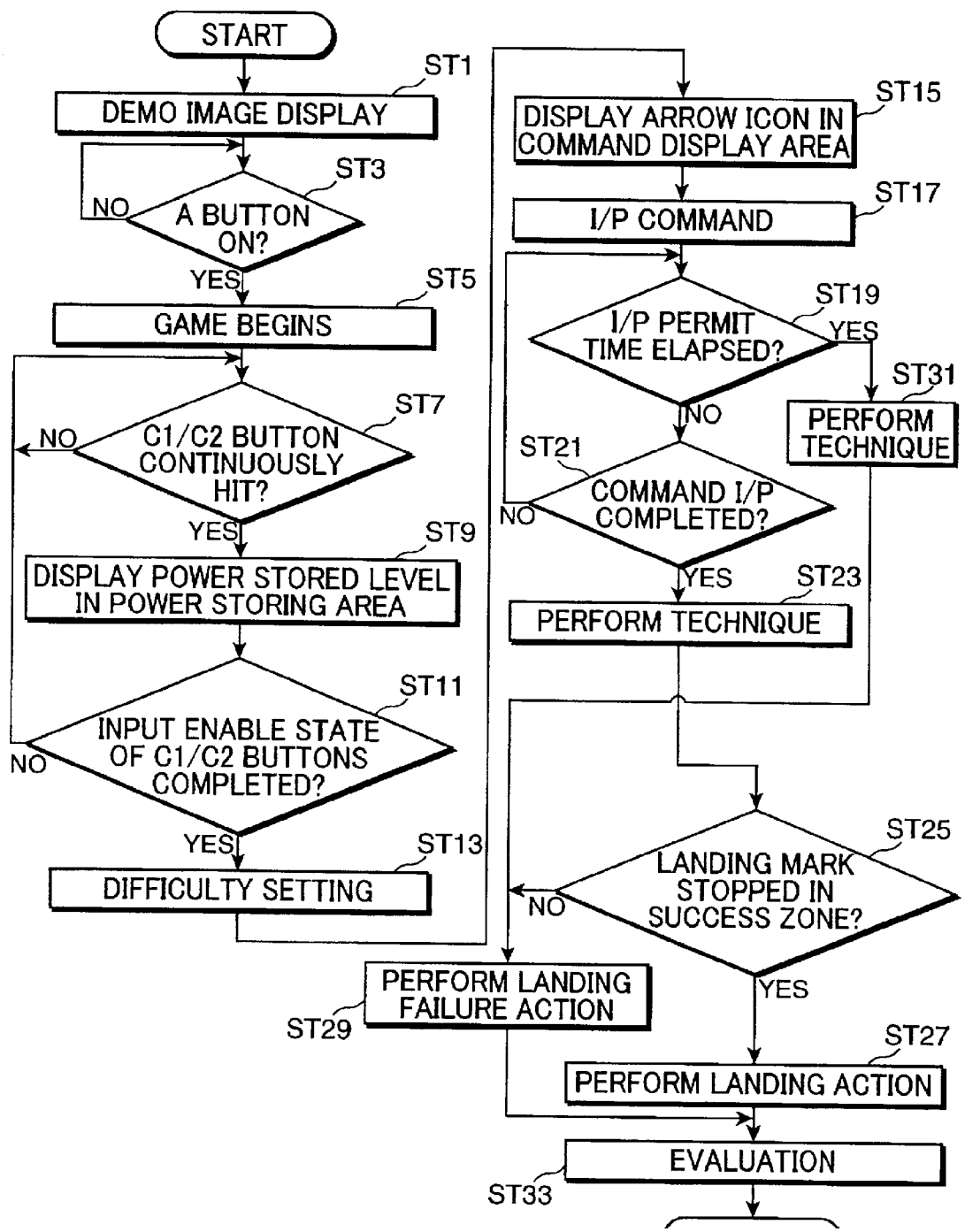
FIG. 6 is a flow chart showing operations performed in the video game system shown in FIG. 1, FIGS. 7 to 13 are diagrams showing game screens in the video game system shown in FIG. 1.

Next, the operation of the video game system 10 in the case that the vaulting horse game is executed is described with reference to a flow chart shown in FIG. 6 and game screens shown in FIGS. 7 to 13. First, when the vaulting horse game is selected by turning the start button 183a on, a demonstration screen is displayed (Step-ST1) and then the A-button operation discriminating unit 201b discriminates whether the A-button 183b has been turned on (Step ST3).

Figure 7:
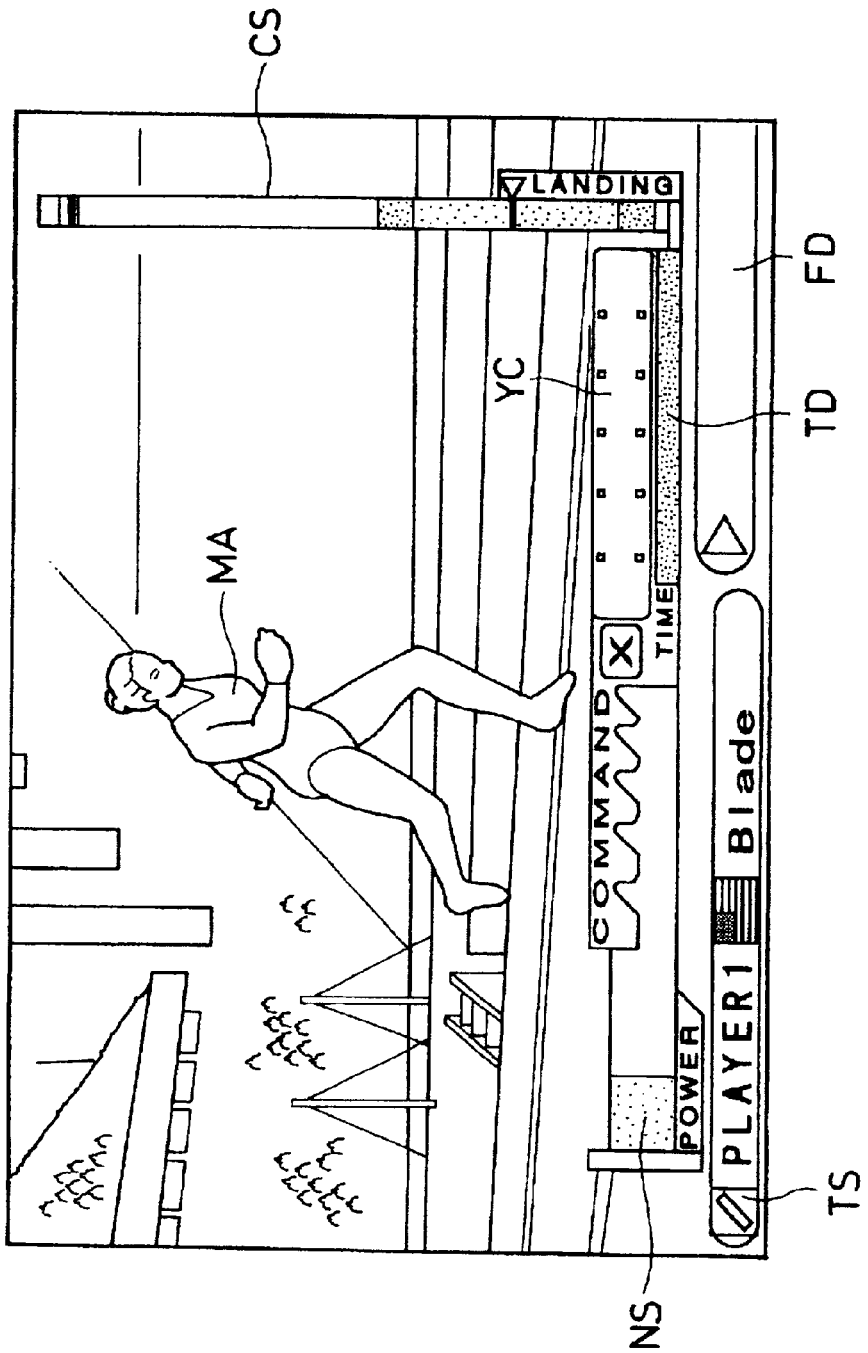

The game is started (Step ST5) if the discrimination result in Step ST3 is affirmative, and the play character MA starts an approach run from the starting position as shown in FIG. 7. At this time, the power storing area 30, the command display area 36 and the remaining time display area 38 are displayed at the bottom of the game screen by the power storing area setting unit 201m, the command display area setting unit 201g and the input permitting time setting unit 201s. Simultaneously, at the right end of the game screen, the landing setting display area 40 is displayed by the landing setting area setting unit 201v and the landing success zone 42 is displayed within the landing setting display area 40 by the landing success zone setting unit 201w. The landing success zone 42 displayed at this time is the widest zone set when the degree of difficulty A is set. It should be noted that this routine waits on standby until the A-button 183b is turned on if the discrimination in Step ST3 is negative.

Subsequently, the C1-button and C2-button operation discrimination unit 201d, 201e discriminate whether the C1-button 183h and the C2-button 183i are being continuously hit (Step ST7). If the discrimination in Step ST7 is affirmative, the level of the stored technique power is displayed to gradually increase in the power storing area 30 by the mark changing unit 201n (Step ST9). The input possibility discriminating unit 201o then discriminates whether an input enabling state by the C1-button 183h and the C2-button 183i has been competed (Step ST11). Specifically, in this embodiment, the input by the C1-button 183h and the C2-button 183i is possible until the play character MA reaches the springboard provided before the vaulting horse. Thus, the discrimination in Step ST11 can be made, for example, based on whether a preset time required for the play character MA to reach the springboard from the starting position or based on whether the coordinate values of the play character MA and those of the springboard have coincided.

Figure 8:
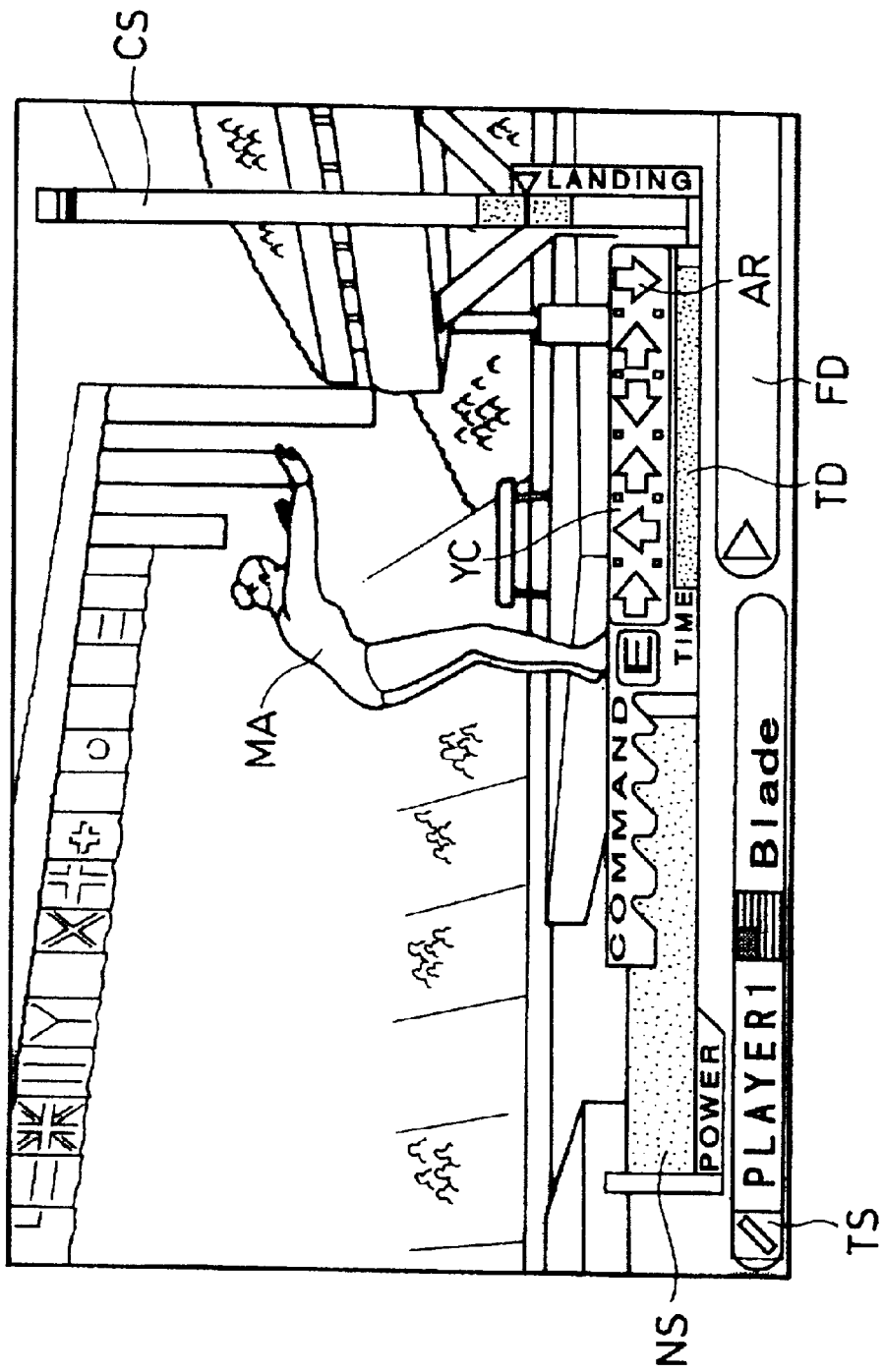

If the discrimination result in Step ST11 is affirmative, the degree of difficulty of the technique is set by the level discriminating/setting unit 201p (Step ST13), and the arrow icons AR are then displayed in their initial states in the command display area 36 by the icon display unit 201r (Step ST15). FIG. 8 shows a game screen of this state where the play character MA is about to jump up from the springboard and the degree of difficulty of the technique is set at E. The arrow icons AR in their initial state are displayed in the command display area 36, and the narrow landing success zone corresponding to the degree of difficulty E is displayed in the landing setting display area 40. If the discrimination result in Step ST11 is negative, this routine returns to Step ST7 to repeat the succeeding operations.

Figure 9:
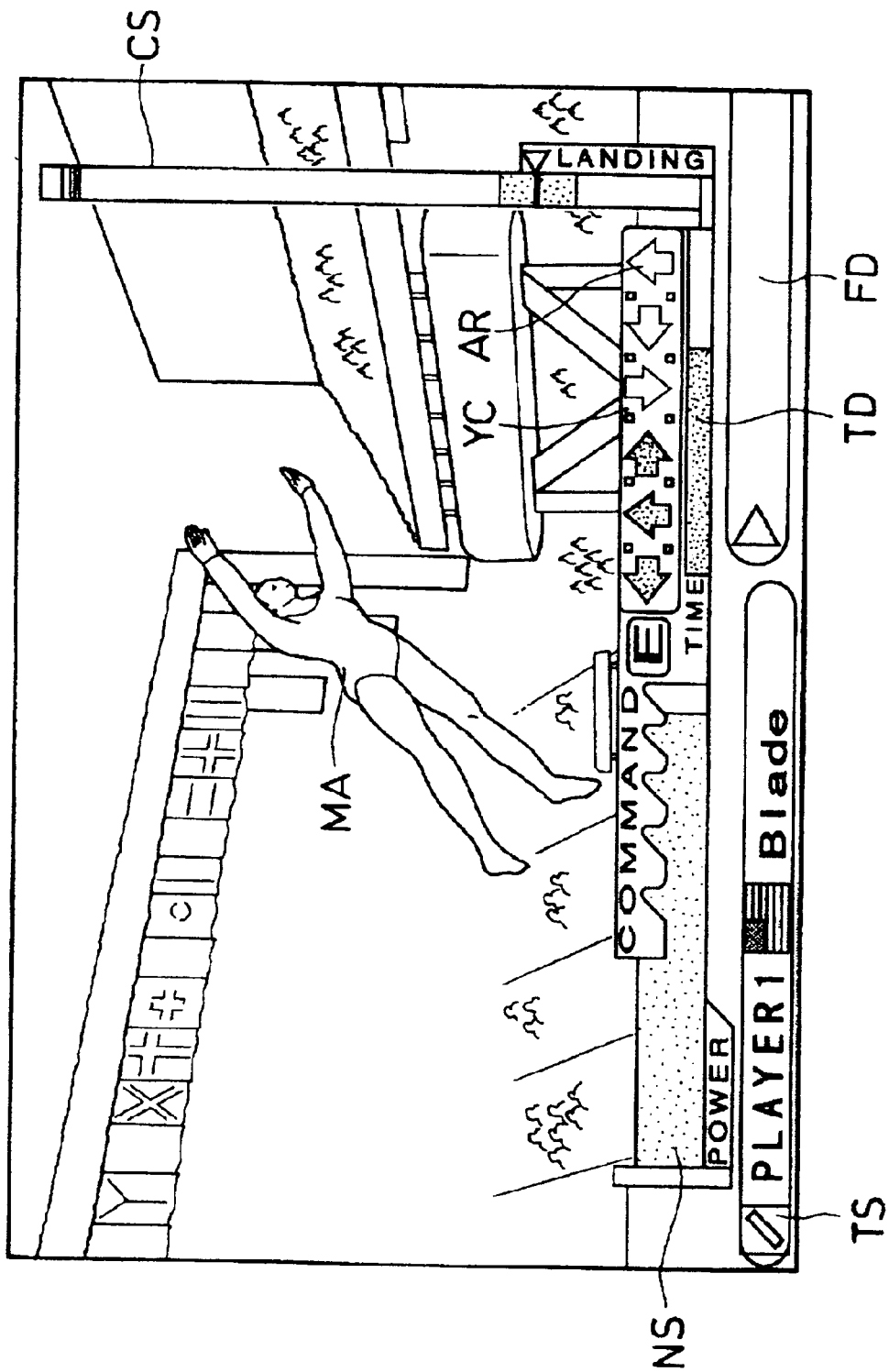

Subsequently, the command is inputted by successively inclining the stick-shaped controller 183e (Step ST17). FIG. 9 shows a game screen of this state where the play character MA just jumped from the springboard and three of the arrow icons AR are still left in their initial states.

Figure 10:
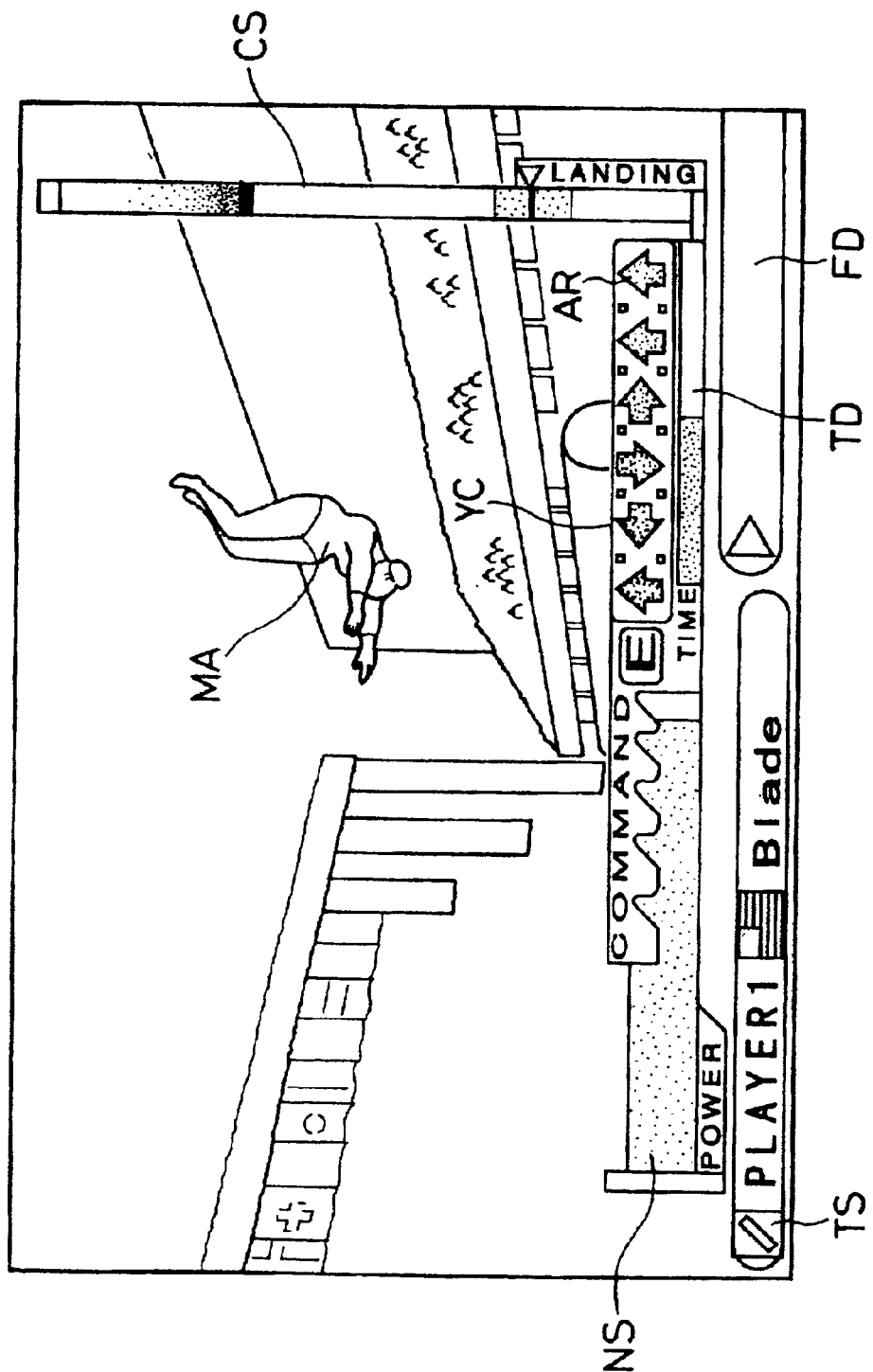

Subsequently, the lapse of permitting time discriminating unit 201t discriminates whether the preset input permitting time has elapsed (Step ST19). If the discrimination result in Step ST19 is negative, the input discriminating unit 201u discriminates whether the command input has been completed (Step ST21). If the discrimination result in Step ST21 is affirmative, the play character MA is caused to perform the set technique (Step ST23). FIG. 10 shows a game screen of this state where the play character MA is somersaulting after jumping up from the vaulting horse. If the discrimination result in Step ST21 is negative, this routine returns to Step ST19 to repeat the succeeding operations.

Subsequently, the coincidence discriminating unit 201y discriminates whether the landing mark 46 has stopped in any one of the first to third zones 421, 422, 423, 424, 425 of the landing success zone 42 while the play character MA is performing the technique (Step ST25). This landing mark 46 is stopped by turning the Z-button 183m on while the play character MA is performing the technique. Unless the Z-button 183m is turned on while the play character MA is performing the technique, processing is continued assuming that the landing mark 46 has not stopped within the landing success zone 42.

Figure 11:
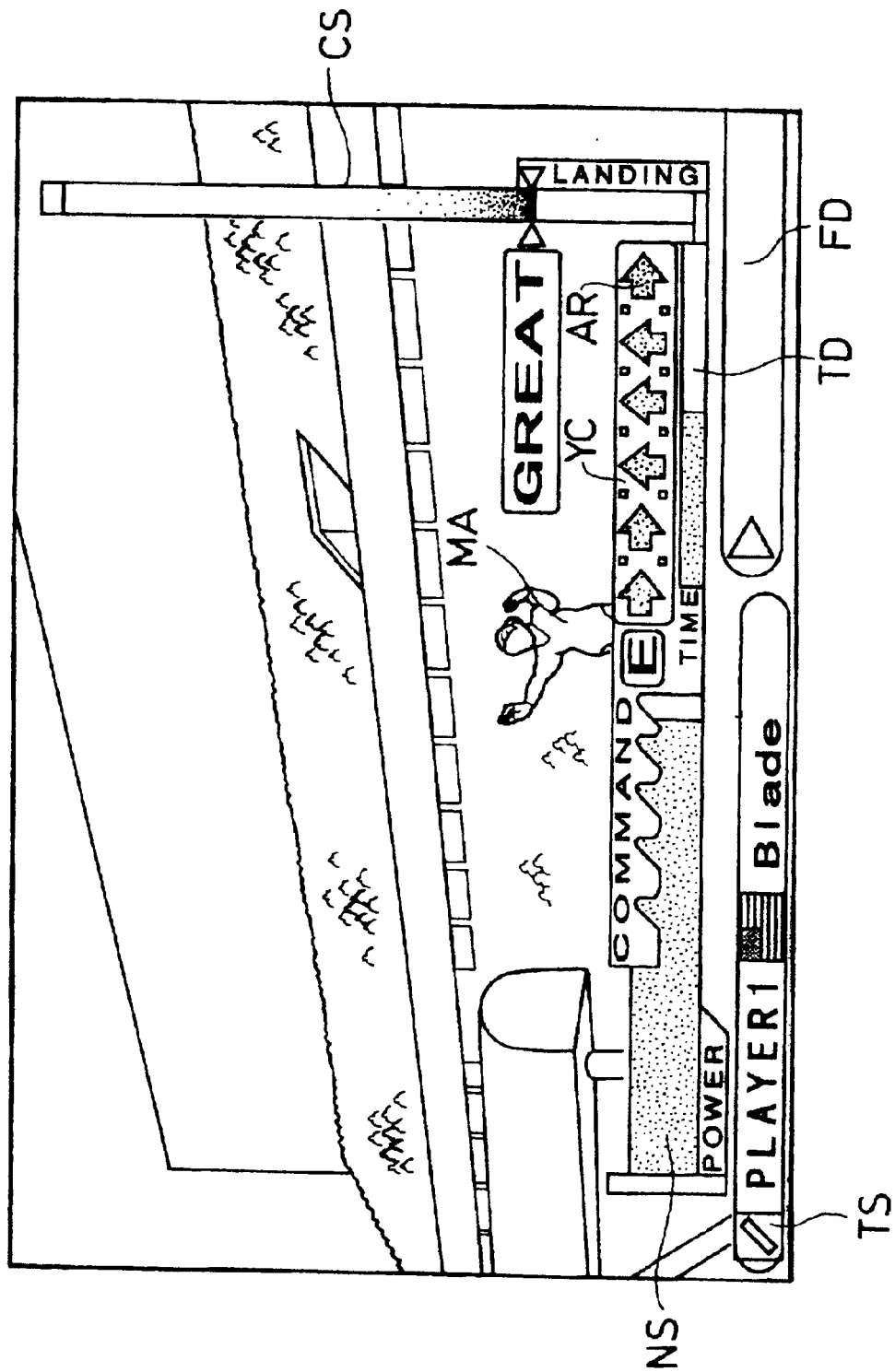
Figure 12:
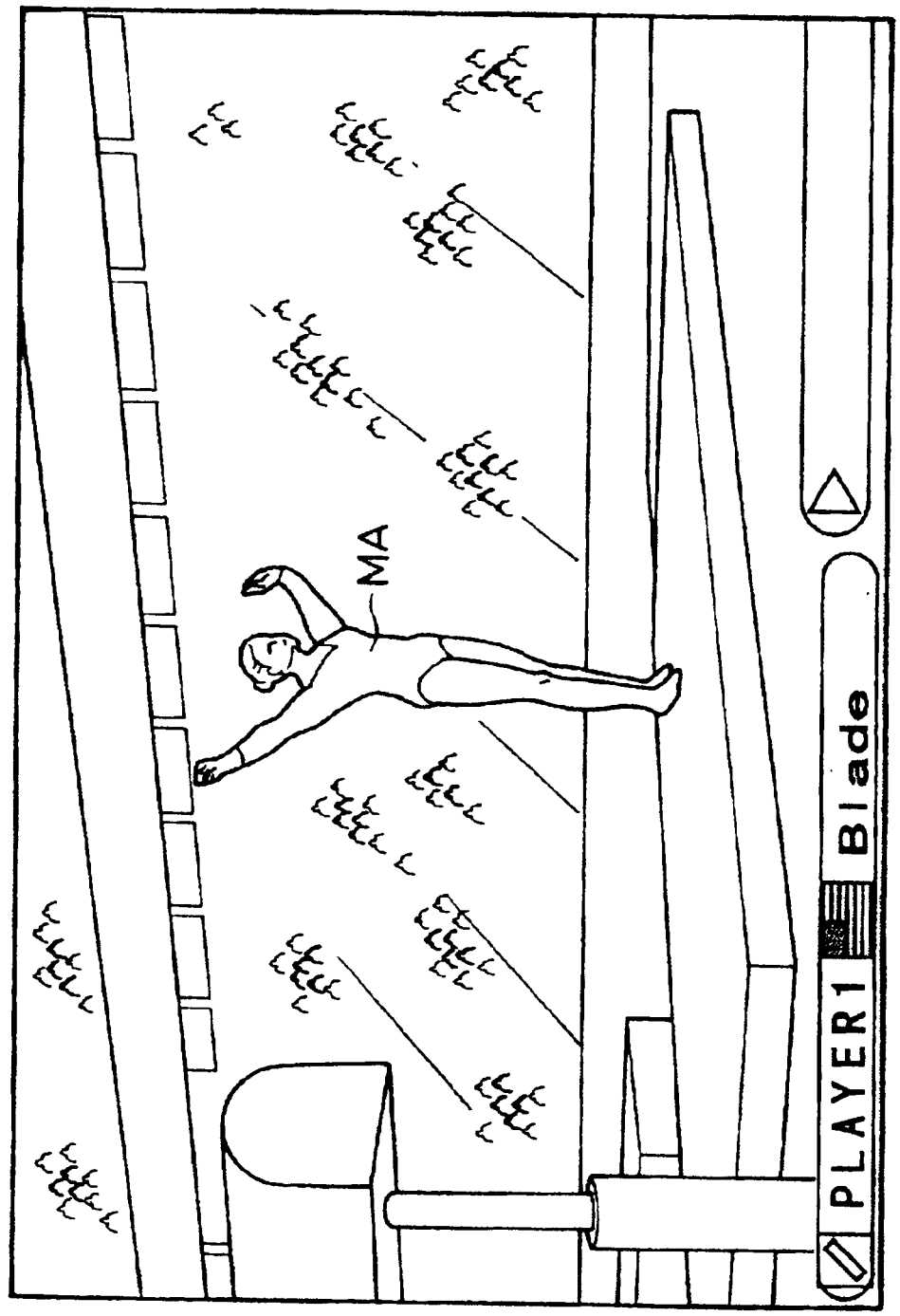

If the discrimination result in Step ST25 is affirmative, landing of a level corresponding to the zone where the landing mark 46 stopped is performed when the performance of the technique by the play character MA is completed (Step ST27). Specifically, the play character MA lands in such a position to which the first place is given when the landing mark 46 stopped within the first zone 421; lands in such a position to which the second place is given when the landing mark 46 is stopped within the second zone 422 or 423; and lands in such a position to which the third place is given when the landing mark 46 is stopped within the third zone 424 or 425. FIGS. 11 and 12 show game screens of this state.

FIG. 11 shows a state immediately after landing, and FIG. 12 shows a state where the play character MA turns by 90° to face judges after completing landing. In FIG. 11, "GREAT" corresponding to the position of the landing mark 46 is displayed, which indicates that the landing mark 46 stopped within the first zone 421. "GOOD" is displayed when the landing mark 46 stopped within the second zone 422 or 423; "POOR" is displayed when it stopped within the third zone 424 or 425; and "BAD" is displayed when it stopped beyond the landing success zone 42. In this way, the respective displays are made in accordance with the position of the landing mark 46. The game can be made highly interesting by displaying the evaluation on the landing setting. This evaluation can be made by providing the CPU 201 with a function realizing unit as a landing setting evaluating unit.

If the discrimination result in Step ST25 is negative (i.e. unless the landing mark 46 stopped within the landing success zone 42), a landing failing operation is performed to, for example, cause the play character MA to fall down upon completing the performance of the technique (Step ST29). If the discrimination result in Step ST19 is affirmative (i.e. if the command input has not been completed despite the lapse of the command input permitting time), the technique having a degree of difficulty set by the degree of difficulty setting unit 201h is performed in this embodiment (Step ST31) and then this routine returns to Step ST29.

Figure 13:
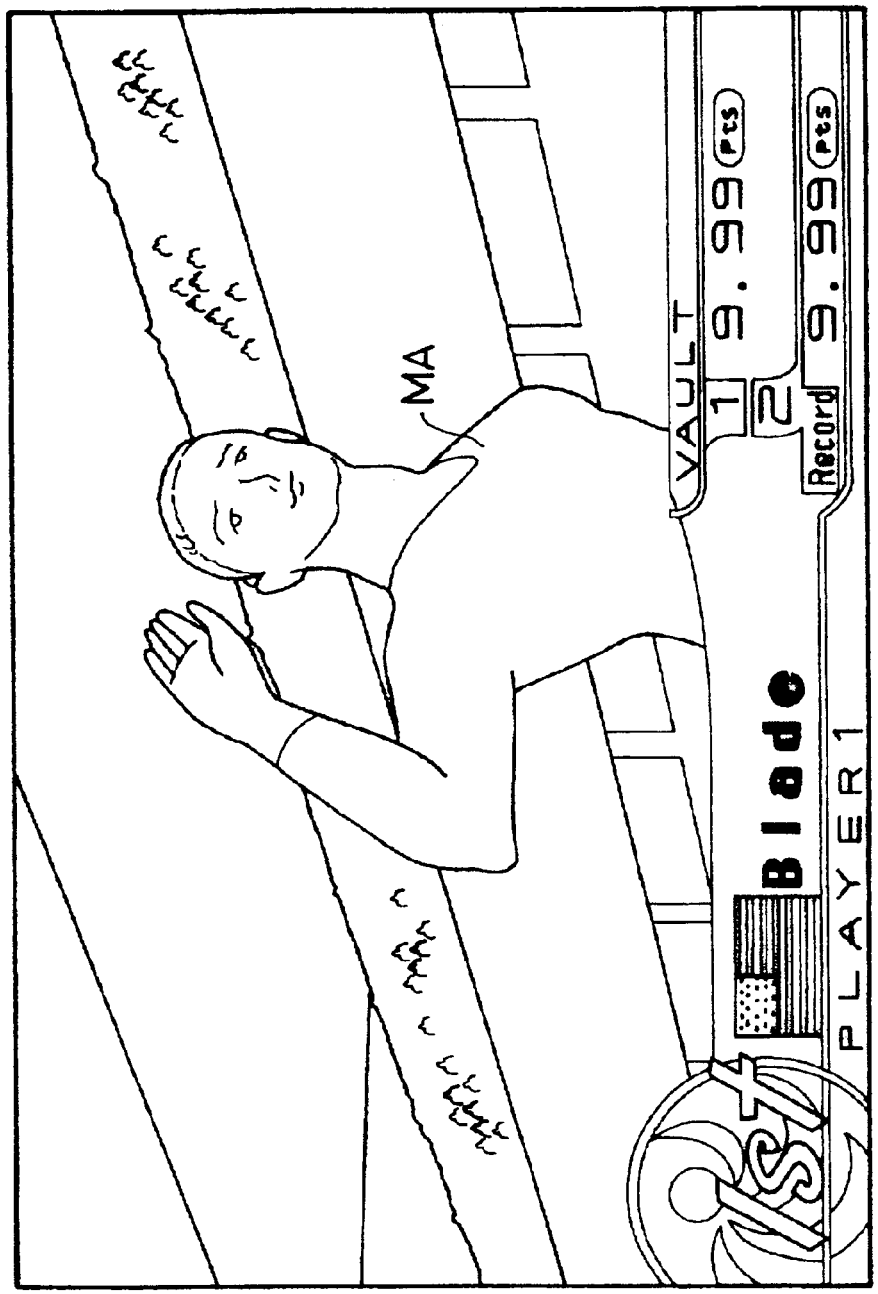

Finally, the technique performed by the play character MA is evaluated based on the degree of difficulty of the technique, the remaining permitting time during the command input, the landing level, etc., and a specified evaluation point is given to the play character MA (Step ST33). FIG. 13 shows a game screen showing this state. FIG. 13 shows that the evaluation point given to the first technique is 9.99 points. It should be noted that the respective play characters perform twice, and ranking is determined based on the average values of the evaluation points given to the first and second performances.

Figure 14:
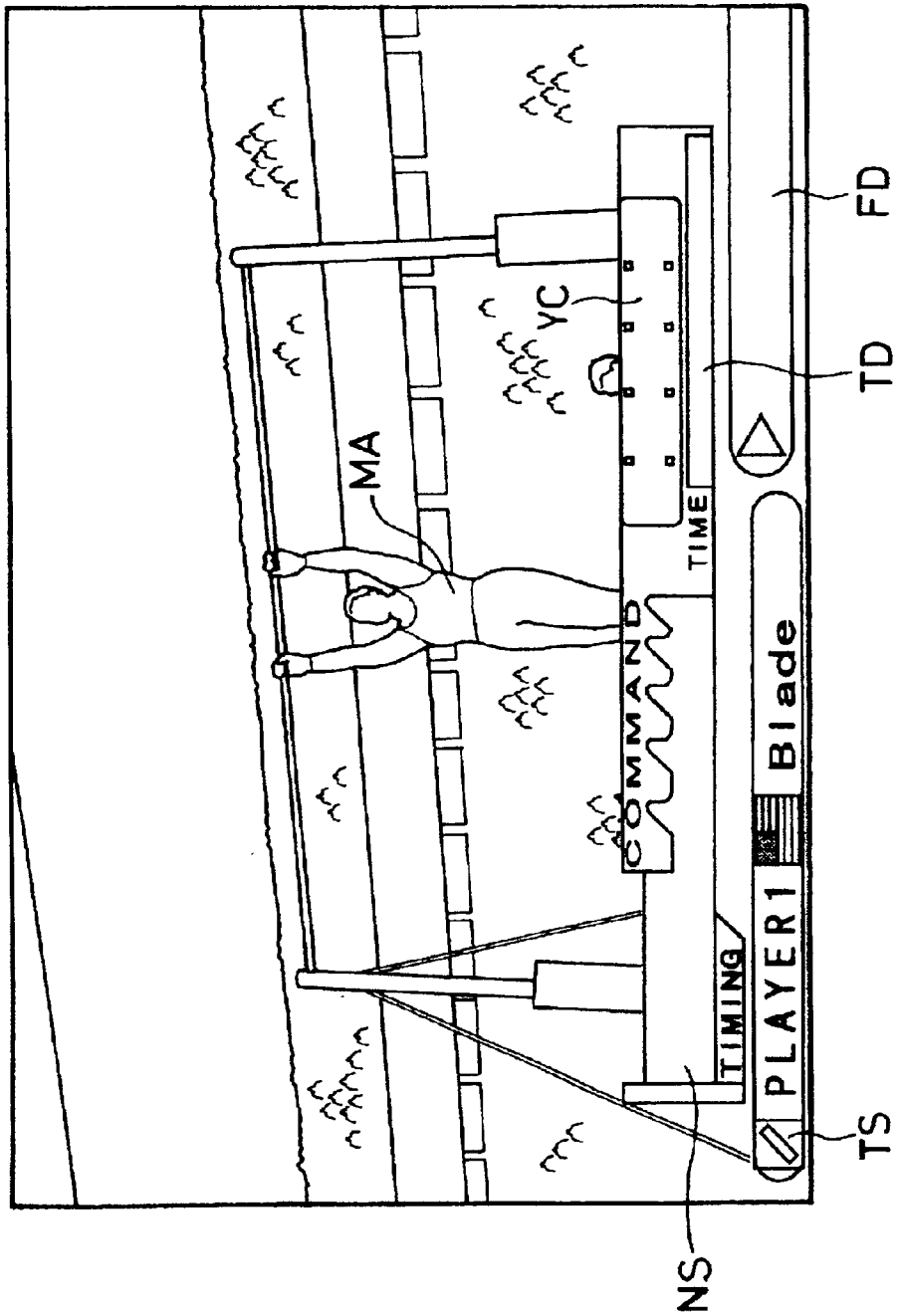
FIG. 14 is a diagram showing one game screen of an other game executed in the video game system shown in FIG. 1.

Next, a display example of the game screen in the case that a horizontal bar game is executed in the video game system 10 is described with reference to FIG. 14. The game screen shown in FIG. 14 is the one which comes up while the horizontal bar game is actually played. Specifically, a play character MA which is a gymnast hanging down from a horizontal bar TB is displayed in the middle of this screen, and a degree of difficulty setting section NS for setting a degree of difficulty of a technique to be performed by the play character MA is laterally displayed at the bottom left side of the screen, and a command input section YC is laterally displayed at the right side of the setting section NS. A time display section TD for displaying a command input permitting time is laterally displayed in proximity to the command input section YC.

Further, a player column TS for displaying an appearing order of the play character MA, a national flag of his nation and his name is set at the bottommost of the game screen. Here, ΠLAYER1" which means a player who appears in the first place, the national flag of the USA and the name "Blade" of the play character MA are displayed.

A foul display column FD for displaying "FAUL" when the controller 183 is not operated for a predetermined time despite the fact that the game was already started is laterally displayed at the right side of the bottommost of the game screen. For example, "TIME10" is displayed in the foul display column FD when the controller 183 is not operated for a predetermined time, and the displayed numerical value is counted down every second and "FOUL" is displayed upon the lapse of 10 sec. In this horizontal bar game, the landing setting unit 201$j$ of the previous vaulting horse game is not provided.

Since the construction and function of the degree of difficulty setting section NS in this horizontal bar game are basically same as in the case of the vaulting horse game shown in FIG. 3, description is made with reference to the construction and reference numerals shown in FIG. 3. Specifically, technique power in the horizontal bar game serves as an index (i.e. mark) indicating a degree of difficulty of a technique performed by the play character MA. Although the stored technique power is gradually increased by alternately and continuously hitting the C1-button 183$h$ and the C2-button 183$i$ in the case of the vaulting horse game, it is automatically increased in the horizontal bar game as time elapses after the game is started.

The power storage area 30 is first colored in red, and becomes yellow as the stored technique power increases. When the game is started, a specified zone is designated from the degrees of difficulty A to E in the level display section 32 of the power storing area 30, and the game player needs to stop the increase of the stored technique power within the zone corresponding to the designated degree of difficulty by turning the Z-button 183$m$ on. The zone can be designated by displaying the designation zone such that, for example, 7 colors successively change from the top to the bottom.

Since the construction and function of the degree of command input section YC in this horizontal bar game are also basically same as in the case of the vaulting horse game shown in FIG. 3, description is made with reference to the construction and reference numerals shown in FIG. 3. Specifically, the command input section YC in this horizontal bar game differs in that five arrow icons AR are displayed in the command display area 36. Further, since the construction and function of the time display section TD in this horizontal bar game are basically same as in the case of the vaulting horse game shown in FIG. 3, description is made with reference to the construction and reference numerals shown in FIG. 3 if necessary.

Figure 15:
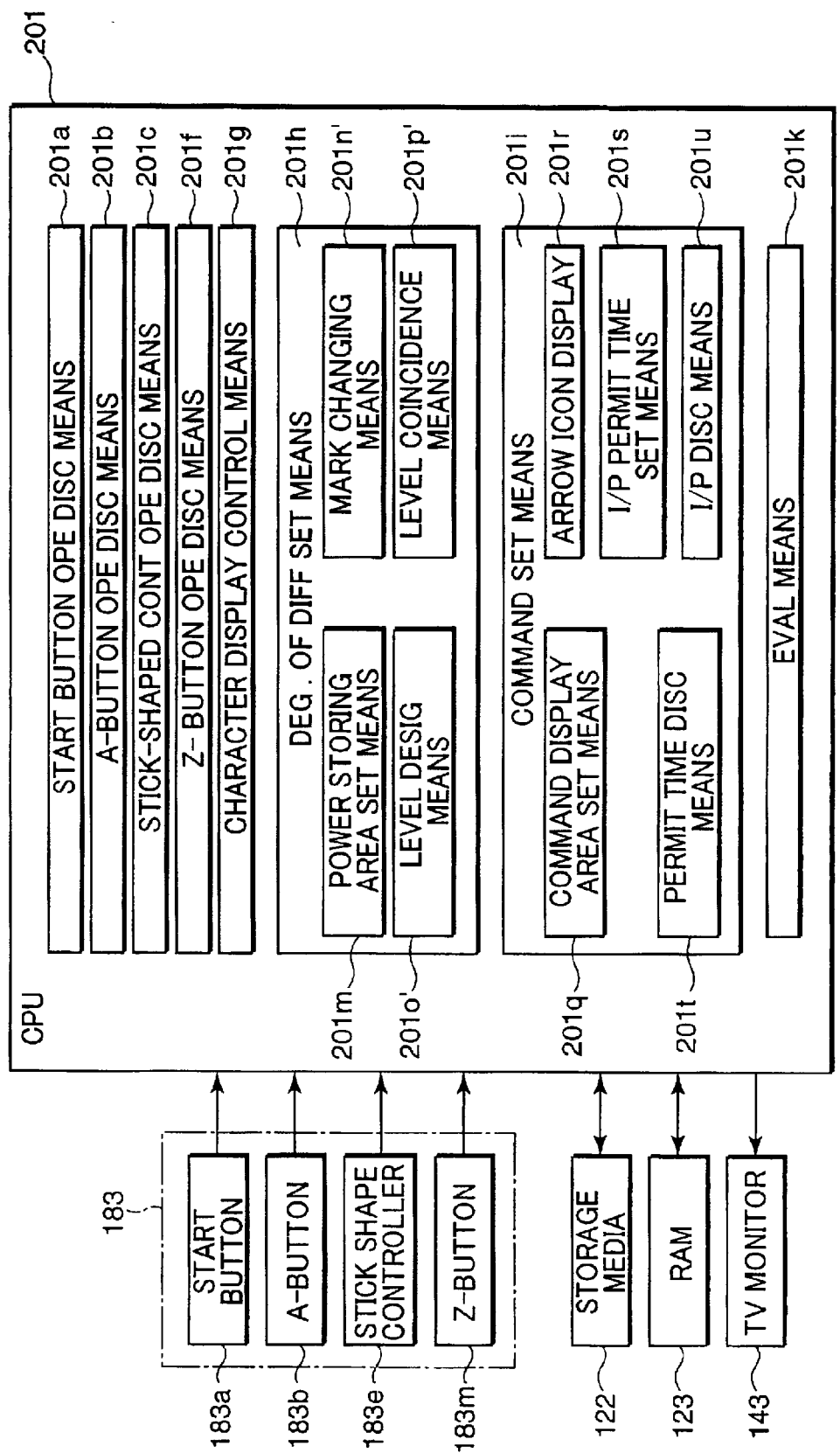
FIG. 15 is a block diagram showing functions of the CPU, a stick-shaped controller, various buttons and the like for executing the other game in the video game system shown in FIG. 1.

FIG. 15 is a block diagram showing function realizing unit of a CPU 201 in the case that the horizontal bar game is executed, a storage medium 122, a RAM 123, a television monitor 143 and a controller 183 (start-button 183$a$, A-button 183$b$, stick-shaped controller 183$e$, and Z-button 183$m$). In this block diagram, no detailed description is given on the same function realizing unit as those of the previous vaulting horse game by identifying them by the same reference numerals.

Specifically, the CPU 201 in the horizontal bar game is provided with the respective function realizing unit as a start button operation discriminating unit 201$a$, an A-button operation discriminating unit 201$b$, a stick-shaped controller operation discriminating unit 201$c$, a Z-button operation discriminating unit 201$f$, a character display control unit 201$g$, a degree of difficulty setting unit 201$h$, a command setting unit 201$i$ and an evaluating unit 201$k$.

The degree of difficulty setting unit 201$h$ is provided with the respective function realizing unit as a power storing area setting unit 201$m$, a mark changing unit 201$n$', a level designating unit 201$o$' and a level coincidence discriminating unit 201$p$'. The command setting unit 201$i$ is provided with the respective function realizing unit as a command display area setting unit 201$q$, an arrow icon display unit 201$r$, an input permitting time setting unit 201$s$, a lapse of permitting time discriminating unit 201$t$ and an input discriminating unit 201$u$.

The mark changing unit 201$n$' of the degree of difficulty setting unit 201$h$ increases the technique power by, e.g. "1" every time a predetermined time elapses after the start of the game, thereby automatically increasing the degree of difficulty of the technique, and successively increases a chromatically colored area of the power storing area 30 as the stored technique power increases. In other words, the technique power serves as an index (i.e. a mark) indicating a degree of difficulty of a technique to be performed by the play character MA, and the mark thereof changes as time elapses.

The level designating unit 201$o$' of the degree of difficulty setting unit 201$h$ designates the degree of difficulty of the technique to be performed by the play character MA, and displays the designated degree of difficulty in the level storing area 30. The level coincidence discriminating unit 201$p$' discriminates whether the degree of difficulty designated by the level designating unit 201$o$' and the degree of difficulty of the technique when the Z-button 183$m$ was turned on coincide.

Figure 16:
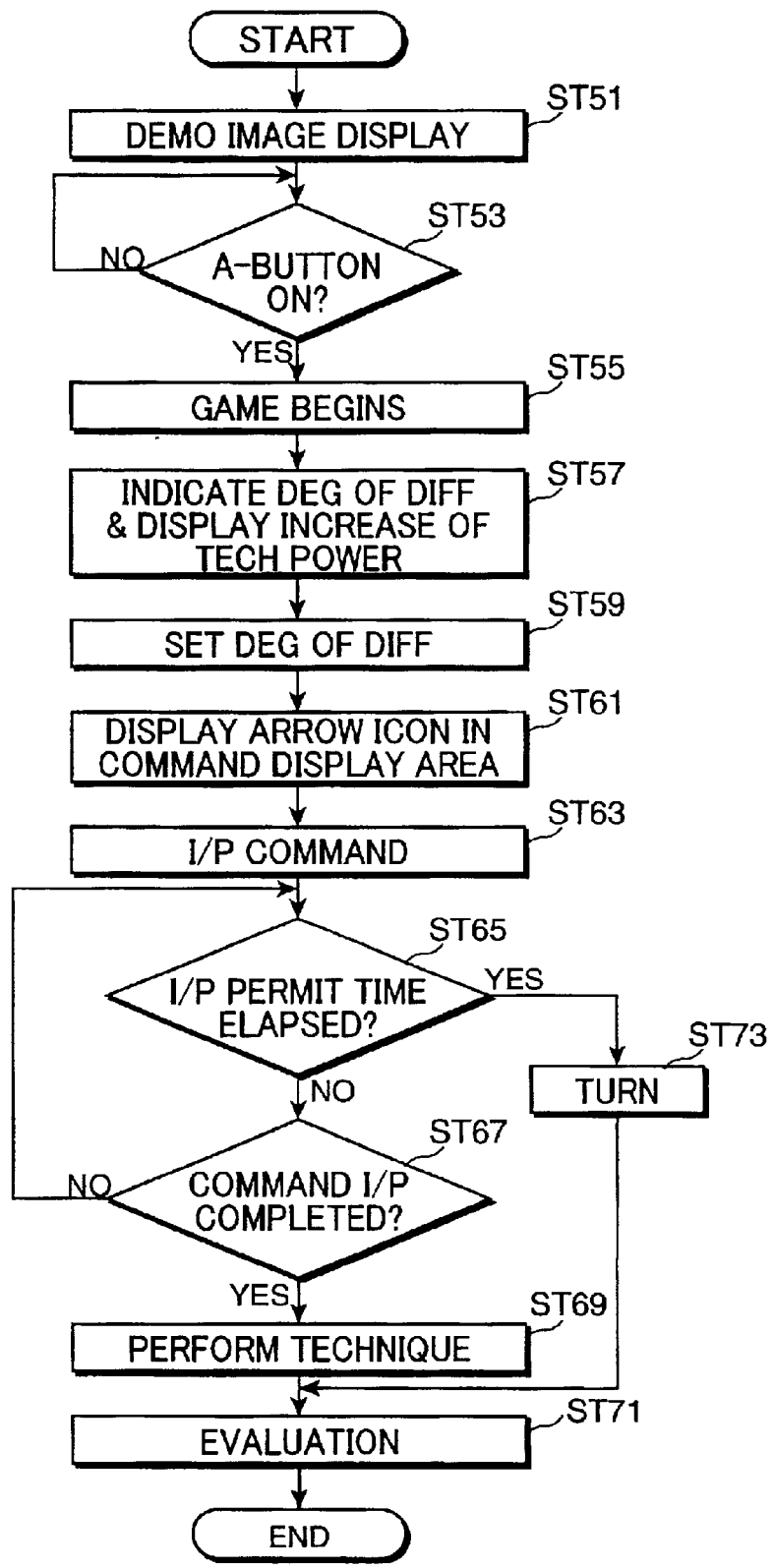
FIG. 16 is a flow chart showing operations for executing the other game in the video game system shown in FIG. 1, and FIGS. 17 to 21 are diagram showing game screens of the other game in the video game system shown in FIG. 1.

Next, the operation of the video game system 10 in the case that the horizontal bar game is executed is described with reference to a flow chart shown in FIG. 16 and game screens shown in FIGS. 17 to 21. First, when the horizontal bar game is selected by turning the start button 183$a$ on, a demonstration screen is displayed (Step ST51) and then the A-button operation discriminating unit 201$b$ discriminates whether the A-button 183$b$ has been turned on (Step ST53).

The game is started (Step ST55) if the discrimination result in Step ST53 is affirmative. At this time, the power storing area 30, the command display area 36 and the remaining time display area 38 are displayed at the bottom of the game screen by the power storing area setting unit 201$m$, the command display area setting unit 201$g$ and the input permitting time setting unit 201$s$ as shown in FIG. 14. If the discrimination result in Step ST53 is negative, this routine waits on standby until the A-button 183$b$ is turned on.

Subsequently, the degree of difficulty of the technique is designated in the power storing area 30 by the level designating unit 201$o$', and the technique power is gradually stored in the power storing area 30 by the mark changing unit 201n' (Step ST57), and the degree of difficulty is set by turning the Z-button 183m on (Step ST59). Specifically, the designated degree of difficulty is set by turning the Z-button 183m on when the level of the stored technique power displayed to automatically increase reaches the designated degree of difficulty. In this way, a high evaluation is given to the technique to be performed. The Z-button 183m can be effectively operated between a substantially upper upright position reached by the play character MA making a half-turn while holding onto a horizontal bar and a substantially lower upright position reached by the play character MA making another half-turn.

Figure 17:
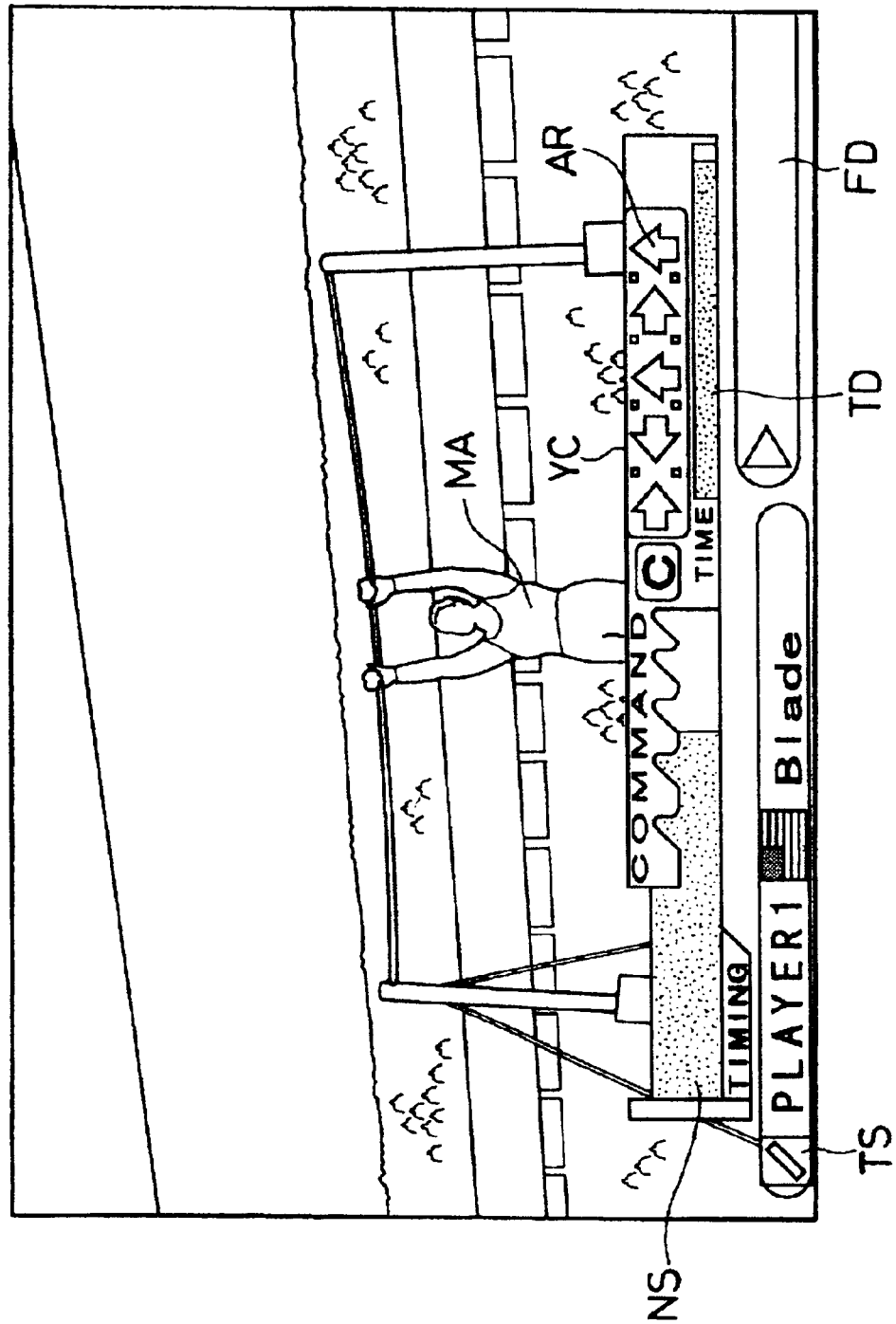

Subsequently, the arrow icons AR are displayed in their initial states in the command display area 36 by the arrow icon display unit 201r (Step ST61). FIG. 17 shows a game screen in a state from Steps ST57 to ST61, in which the degree of difficulty of the technique is set at C and the arrow icons AR are displayed in their initial states in the command display area 36. A remaining permitting time for the command input is displayed in the remaining time display area 38. The arrow icons AR are displayed even in the case that the designated degree of difficulty is missed due to an operation failure of the Z-button 183m, so that the command input can be made. However, such a case leads to minus points in making the evaluation.

Figure 18:
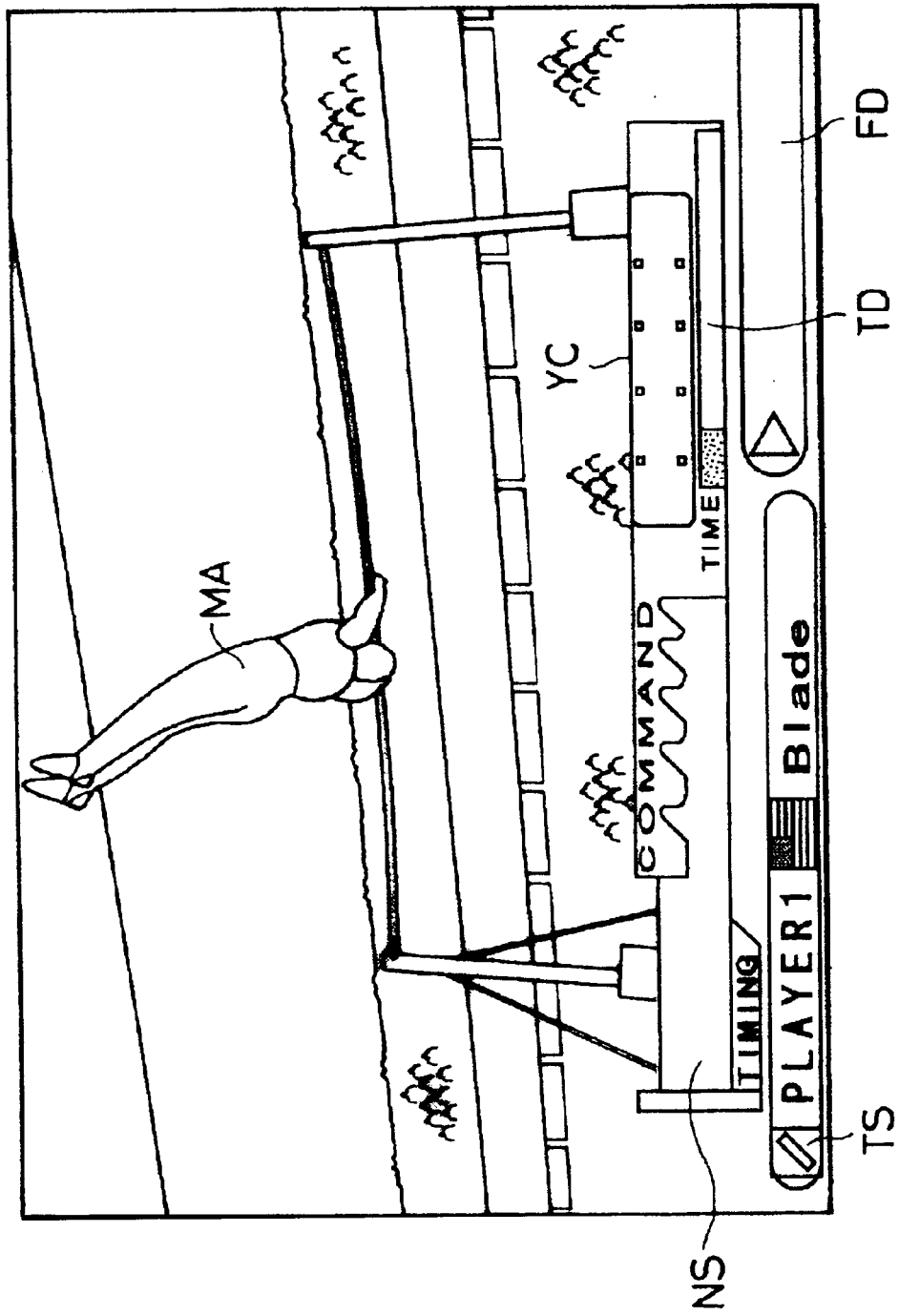

Subsequently, the command is inputted by successively inclining the stick-shaped controller 183e (Step ST63). Then, the lapse of permitting time discriminating unit 201t discriminates whether the preset input permitting time has elapsed (Step ST65). If the discrimination result in Step ST65 is negative, the input discriminating unit 201u discriminates whether the command input has been completed (Step ST67). If the discrimination result in Step ST67 is affirmative, the play character MA is caused to perform the set technique (Step ST69). FIG. 18 shows a game screen in which the play character MA is performing the technique by making a turn.

Upon completion of one technique, an evaluation is made for this technique (Step ST71). This evaluation is made based on the set degree of difficulty, the remaining permitting time for the command input, etc., but is not displayed on the game screen every time one technique is performed, and a total point is displayed after eight techniques are performed. If the discrimination result in Step ST67 is negative, this routine returns to Step ST65 to repeat the succeeding operations. If the discrimination result in Step ST65 is affirmative (i.e. if the command input has not been completed despite the lapse of the command input permitting time), the play character MA only makes a turn without performing the technique of the degree of difficulty set by the degree of difficulty setting unit 201h (Step ST73) and then this routine returns to Step ST71. Even in the case of making only a turn, this performance is evaluated, but a low point is given.

Figure 19:
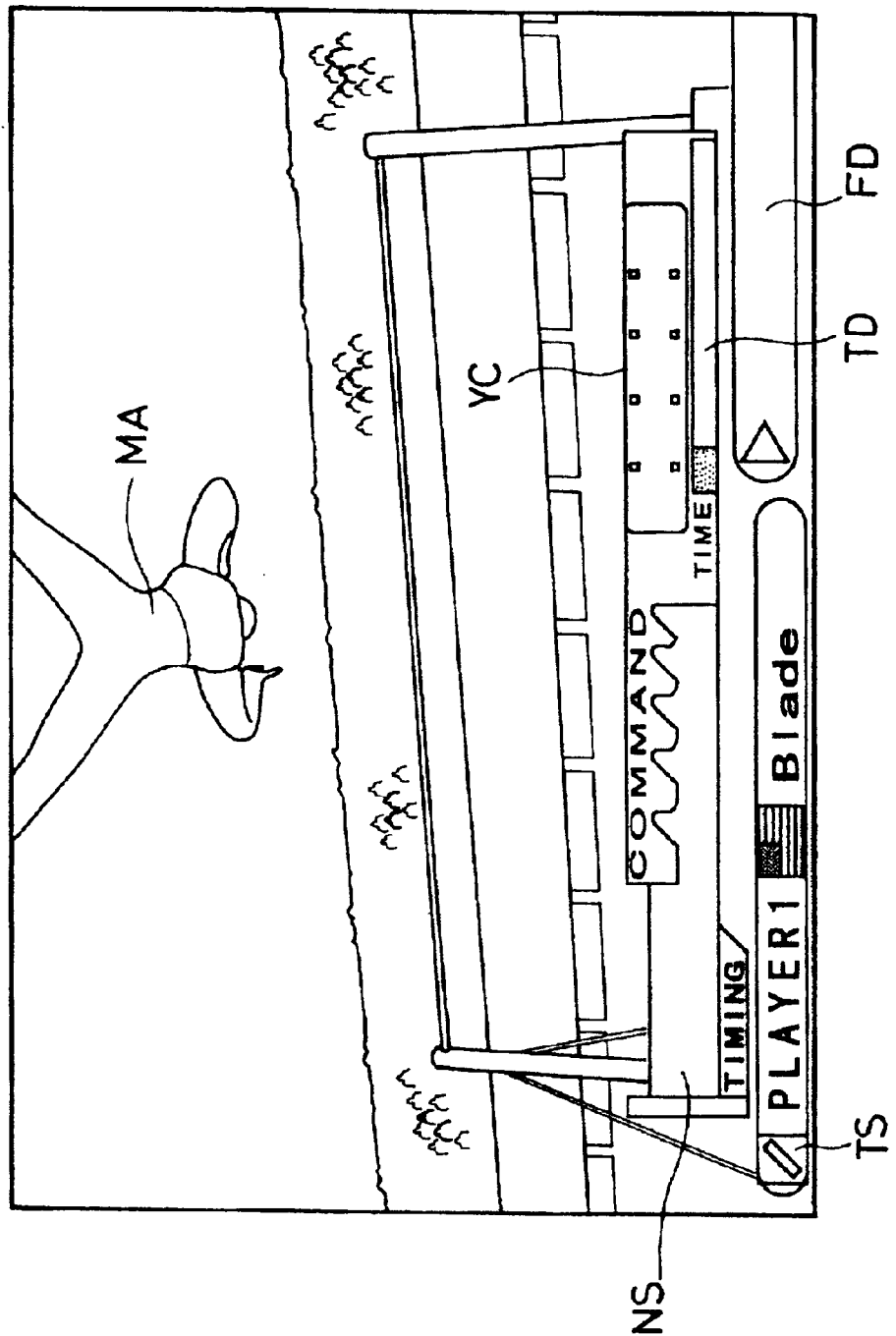
Figure 20:
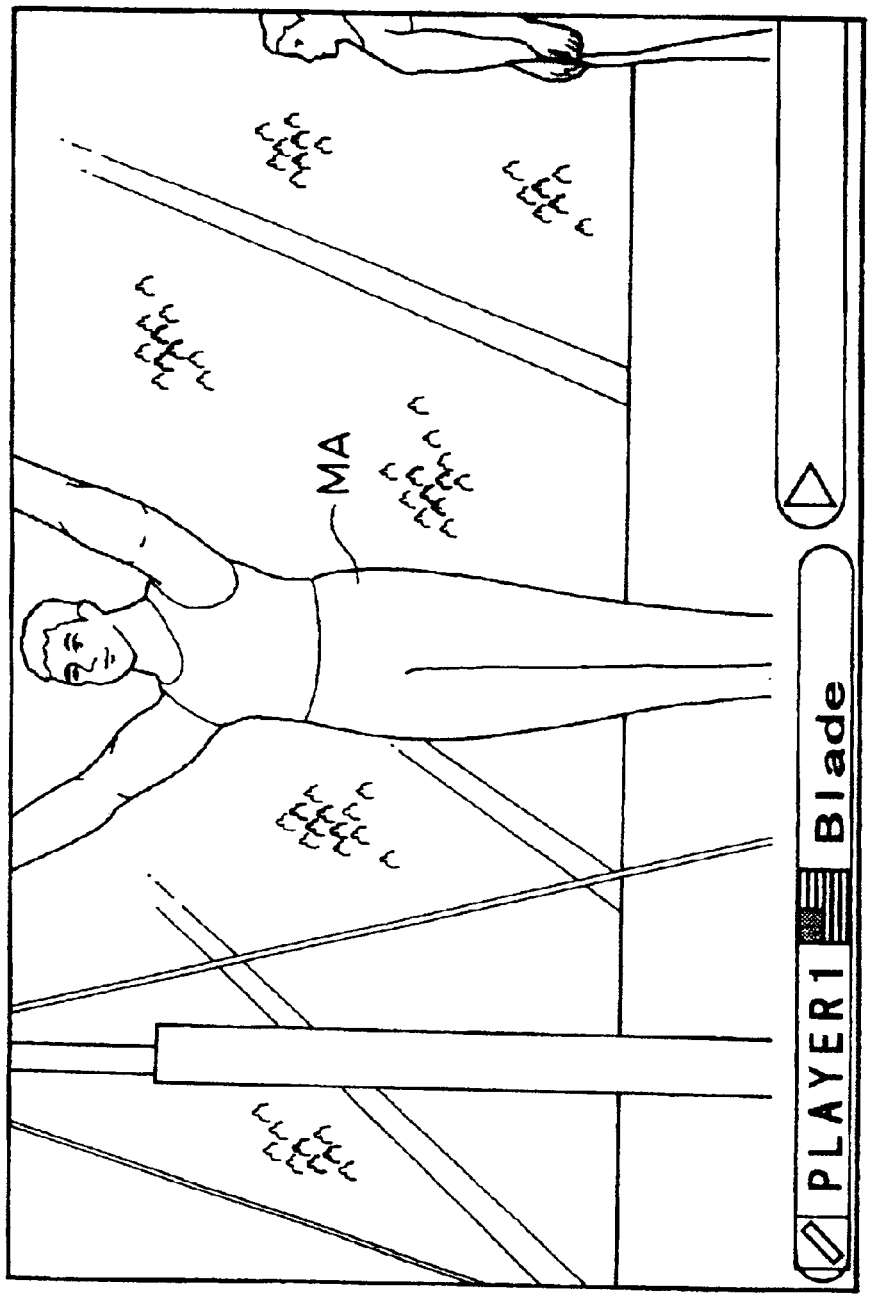
Figure 21:
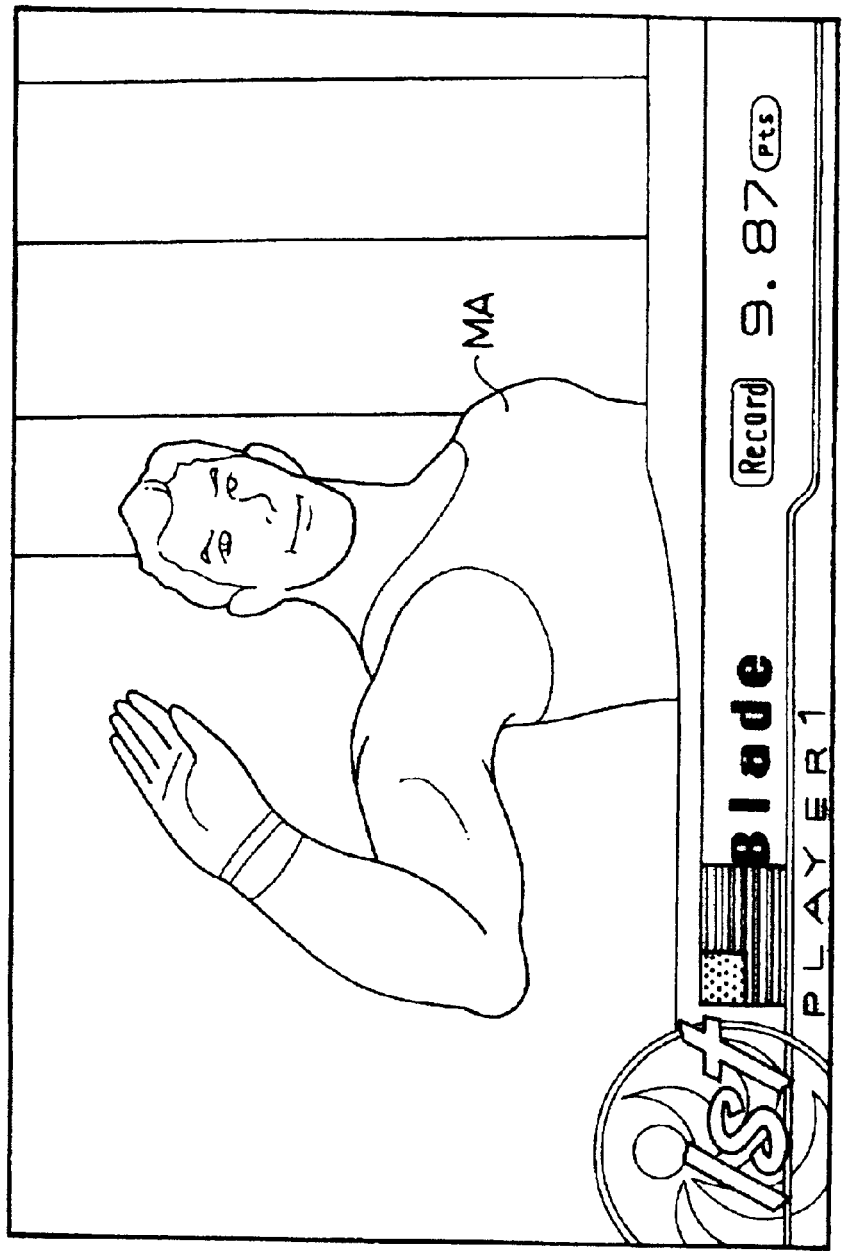

Since eight techniques are continuously performed in the horizontal bar game, this routine returns to Step ST57 after one technique is completed and evaluated, and the same operations are repeated thereafter. Landing of a preset content is finished upon completion of the eighth technique, and a total evaluation point for the eight techniques are displayed on the game screen upon completion of landing. FIGS. 19 to 21 are game screens showing this state. FIG. 19 shows a state immediately after the play character MA starts landing after performing the eight techniques, and FIG. 20 shows a state where landing has been completed. In FIG. 21 is displayed a total evaluation point for the eight techniques, which is 9.87 points.

As described above, according to this embodiment, the degree of difficulty of the technique to be performed by the play character is set; the inputting operation of the command for causing the play character MA to perform the technique corresponding to the set degree of difficulty is guided; the command is inputted by operating the stick-shaped controller 183e in accordance with the guide; and the technique performed in this way is evaluated.

Thus, the game player is required to, e.g. set the degree of difficulty and input the command, which causes the operating ability of the game player to be reflected on the evaluation of the game result, and the evaluation differs depending on the remaining permitting time for the command input, or other factor. Therefore, a highly interesting and ingenuous video game can be realized.

The present invention is not limited to the foregoing embodiment, and it may take various embodiments described below.

(1) Although the landing setting unit 201h is provided in the case of the vaulting horse game in the foregoing embodiment, landing may be automatically finished in a preset posture. Further, although landing is automatically finished in a preset posture in the case of the horizontal bar game, the landing setting unit 201h may be provided as in the case of the vaulting horse game.

(2) Although the level of the stored technique power is displayed by chromatically coloring the power storing area 30 in the foregoing embodiment, it may be displayed by coloring the power storing area 30 in achromatic colors such as gray and black. In the case of chromatic coloring, the power storing area 30 may be colored in a single color. Further, even in the case that the tone of the chromatic color is changed, it may be changed from warm color to cold color or different chromatic colors may be randomly given to the power storing area 30.

(3) Although the level of the stored technique power is displayed by chromatically coloring the power storing area 30 in the foregoing embodiment, it may be displayed in numerical values or animated images (marks) which changes according to the reached level. The degree of difficulty setting section NS may be comprised only of the degree of difficulty display section 34 where the degree of difficulty is displayed in any of marks A to E. In other words, it is sufficient to display the mark representing the corresponding degree of difficulty.

(4) Although the "vaulting horse game" and the "horizontal bar game" are described as gymnastic games to be executed in the foregoing embodiment, the present invention is also applicable to any other apparatus gymnastic game executed using an apparatus other than the vaulting horse and the horizontal bar, a rhythmic gymnastic game in which a play character repeatedly performs various techniques such as somersaults and turns within a specified field without using an apparatus, or a field athletic game such as the long jump or pole vault). In other words, the present invention is applicable to various games provided that they need preparation for a specified technique before performing it.

As described above, in the inventive video game executed by displaying the play character on the game screen image displayed on the monitor and causing the play character to perform a plurality of techniques having different degrees of difficulty and prepared in advance by operating the operation unit, the degree of difficulty of the technique to be performed by the play character is set; the inputting operation of the command for causing the play character to perform the technique corresponding to the set degree of difficulty is guided; and the technique performed by inputting the command through operation of the first operable member provided in the operation unit in accordance with the guide is evaluated.

Thus, the game player is required to, e.g. set the degree of difficulty and input the command, which causes the operating ability of the game player to be reflected on the evaluation of the game result. This forces the game player to constantly tensely operate the operable member. As a result, a highly interesting and ingenuous video game which does not bore the game player can be realized.

According to the present invention, the marks corresponding to the degrees of difficulty may be changed as time elapses, and a specified one may be selected from the changing marks by operating the second operable member provided in the operation unit. This enables the game to smoothly proceed without giving the game player a big burden even in the case of repeatedly setting techniques as in the horizontal bar game.

According to the present invention, the marks corresponding to the degrees of difficulty may be changed by operating the third operable member. This enables the progress of the game to largely change by the operating ability of the game player, thereby realizing a highly interesting and ingenuous video game.

According to the present invention, the play character may be caused to finish the landing. This enables the game content to change, thereby realizing an even more interesting and ingenuous video game.

Further, according to the present invention, the landing setting display area for setting the landing of the play character may be set in a partial area of the game screen image; the landing success zone may be set in the landing setting display area and the landing mark may be movingly displayed; and landing may be enabled by operating the fourth operable member provided in the operation unit when the landing mark is located within the landing success zone. This requires the game player to set and operate for landing, which enables the operating ability of the game player to be reflected on the evaluation of the game result. This forces the game player to constantly tensely operate the operable member. As a result, a more highly interesting and ingenuous video game can be realized.

According to the present invention, the higher the degree of difficulty, the narrower the landing success zone may be set. This makes the setting operation for the landing difficult, and causes the progress of the game to largely change depending on the operating ability of the game player. As a result, a further highly interesting and ingenuous video game can be realized.

According to the present invention, the command input area may be set in a partial area of the game screen image, and the command may be displayed in this input area in the form of icons. Thus, the game player can be easily guided to perform the command inputting operation, enabling the game to smoothly proceed.

According to the present invention, the shorter time is required to input the command, the higher evaluation may be given. This causes the progress of the game to largely change % depending on the operating ability of the game player. As a result, a further highly interesting and ingenuous video game can be realized.

According to the present invention, when the input of the command is not completed within the predetermined time, the play character may be caused to perform an action different from the one performed when it is completed within the predetermined time. This enables the game to proceed even in the case of failing the command input. Therefore, even beginners can enjoy the game.

According to the present invention, if a high degree of difficulty is set, the play character is caused to perform a complicated technique. This causes the progress of the game to change depending on the operating ability of the game player. As a result, a further highly interesting and ingenuous video game can be realized.

This application is based on Japanese application serial no. 2000-11069 filed on Jan. 19, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A video game device for displaying a play character on a game screen image displayed on a monitor and causing the play character to perform a plurality of techniques having different degrees of difficulty, comprising:
   a degree of difficulty setting unit for setting a degree of difficulty of a technique to be performed by the play character, said degree of difficulty setting unit including a mark changing unit for changing a size of a mark, said size of said mark being progressively increased in correspondence with a greater the degree of difficulty of the technique;
   a command setting unit for setting a series of commands in accordance with said set degree of difficulty, said series of commands requiring corresponding successive command inputs by the game player to guide the play character throughout the technique corresponding to the degree of difficulty set,
   a command guiding unit for guiding the game player, by displaying said series of commands, to input said successive command inputs for causing the play character to perform said technique corresponding to the set degree of difficulty,
   an operation unit for causing the play character to perform the technique according to the set degree of difficulty in accordance with said successive command inputs input by the game player throughout execution of said technique, the operation unit including:
   a first operable member, operated by the game player, for inputting the successive command inputs in accordance with the said series of commands displayed by the command guiding unit, and
   a second operable member, operated by the game player, for causing said mark changing unit to set the size of said mark in response to operations of said second operable member performed by the game player within a predetermined time period;
   an evaluating unit for evaluating the technique performed by the play character in accordance with the successive command inputs given by the first operable member.

2. A video game device according to claim 1, wherein the mark changing unit is further responsive to a third operable member provided in the operation unit.

3. A video game device according to claim 1, further comprising a landing setting unit for causing the play character to land.

4. A video game device according to claim 1, wherein a higher evaluation is given as a shorter time is required by the game player to input the successive command inputs.

5. A video game device according to claim 1, wherein when the input of the successive command inputs is not completed within a predetermined time, the play character is caused to perform an action different from one performed when said successive command inputs are completed within the predetermined time.

6. A video game device according to claim 1, wherein the play character is caused to perform a complicated technique when the set degree of difficulty is high.

7. The video game device according to claim 1, wherein said mark changing unit changes the size of the mark in accordance with the number of operations of the second operable member performed by the game player within the predetermined time period.

8. The video game device according to claim 7, wherein said size of the mark grows as the number of operations of the second operable member increases.

9. The video game device according to claim 7, wherein said second operable member is comprised of two operable buttons and the degree of difficulty of the technique to be performed by the play character is increased as the number of alternative on-and-off operations of the two operable buttons increases within the predetermined time period.

10. A video game for displaying a play character on a game screen image displayed on a monitor and causing the play character to perform a plurality of techniques having different degrees of difficulty, comprising:

a degree of difficulty setting unit for setting a degree of difficulty of a technique to be performed by the play character, said degree of difficulty setting unit including a mark changing unit for changing a size of a mark, said size of said mark corresponding to the degree of difficulty of the technique;

a command guiding unit for providing a command input guide guiding the game player in command input for causing the play character to perform the technique corresponding to the set degree of difficulty, an operation unit for causing the play character to perform the technique according to the set degree of difficulty based on the command input executed by the game player, the operation unit including:

a first operable member, operated by the game player, for inputting the command in accordance with the command input guide given by the command guiding unit, and a second operable member, operated by the game player, for causing said mark changing unit to set the size of said mark larger in response to a greater number of operations of said second operable member performed by the game player within a predetermined time period;

an evaluating unit for evaluating the technique performed in accordance with the command given by the first operable member based on correspondence with said command input guide; and a landing setting unit for causing the play character to land, the landing setting unit setting a landing setting display area for setting the landing of the play character in a partial area of the game screen image, setting a landing success zone in the landing setting display area, displaying a landing mark which is movable, and enabling landing of the play character through operation of a fourth operable member provided in the operation unit when the landing mark is located within the landing success zone.

11. A video game device according to claim 10, wherein the landing success zone is set narrower as the degree of difficulty is set higher.

12. A video game device according to claim 10, wherein a command input area is set in a partial area of the game screen image, and the command input guide is displayed in the input area in the form of icons.

13. A technique setting method for setting a technique in a video game for displaying a play character on a game screen image displayed on a monitor and causing the play character to perform a plurality of techniques having different degrees of difficulty and prepared in advance by operating an operation unit, the method comprising the steps of:

progressively increasing a size of a mark in correspondence with a degree of difficulty of a technique in response to a game player input;

setting the degree of difficulty of the technique to be performed by the play character in correspondence with a size of the mark;

guiding inputting succesive operations of a first operable member in accordance with a command for causing the play character to perform a technique corresponding to the set degree of difficulty;

controlling the play character to perform the technique based on the successive operations of the first operable member wherein the play character performs throughout execution of the technique in accordance with the successive operations;

evaluating the technique performed by the name player by inputting the operations on the first operable member in accordance with the guiding based on the command; and wherein the step of progressively increasing the size of the mark includes the name player input being a number of operations of a second operable member by the game player and setting the size of said mark larger is in response to the number of operations of the second operable member by the game player within a predetermined time period to indicate the degree of difficulty is greater wherein the size of the mark is increased with increase in a total number of the number of operations.

14. A technique setting method according to claim 13, further comprising the step of changing said mark corresponding to the degree of difficulty through operation of a third operable member in conjunction with said second operational member.

15. A technique setting method according to claim 13, further comprising the step of causing the play character to land.

16. A technique setting method for setting a technique in a video game for displaying a play character on a game screen image displayed on a monitor and causing the play character to perform a plurality of techniques having different degrees of difficulty and prepared in advance by operating an operation unit, the method comprising the steps of:

changing a size of a mark in a manner corresponding to a degree of difficulty of a technique to be performed by the play character;

setting the degree of difficulty of technique to be performed by the play character to correspond to the size of the mark;

guiding an inputting successive operations by the player on a first operable member based on a command for causing the play character to perform the technique corresponding to the set degree of difficulty;

controlling the play character to perform the technique with control of the play character throughout the technique based on correspondence of said successive operations with said command;

evaluating the technique performed by inputting the successive operations in accordance with the command through operations of the first operable member;

setting the size of said mark in response to operations of a second operable member by the game player within a predetermined time period wherein the size of the mark is increased with increase in a total of the number of operations;

setting a landing setting display area for setting the landing of the play character in a partial area of the game screen image;

setting a landing success zone in the landing setting display area;

displaying a landing mark which is movable;

enabling landing of the play character through operation of a fourth operable member provided in the operation unit when the landing mark is located within the landing success zone; and causing the play character to land.

17. A computer readable recording medium storing a technique setting program in a video game for displaying a play character in a game screen image displayed on a monitor and causing the play character to perform a plurality of techniques having different degrees of difficulty and prepared in advance by operating an operation unit, the technique setting program comprising the steps of:

progressively increasing a size of a mark in correspondence with a degree of difficulty of a technique in response to a game player input;

setting the degree of difficulty of the technique to be performed by the play character in correspondence with a size of the mark;

guiding an inputting operation of a series of commands requiring corresponding successive command inputs by the game player on a first operable member for causing the play character to perform a technique corresponding to the set degree of difficulty;

receiving said successive command inputs from the first operable member operated by the game player;

controlling the play character to perform the technique with control of the play character throughout the technique based on correspondence of said successive command inputs with said series of commands;

evaluating the technique performed by the play character in response to the inputting of the successive command inputs based on correspondence of said successive command inputs with said series of commands; and wherein the step of progressively increasing the size of the mark includes setting the size of said mark in response to the game player input being a number of operations of a second operable member by the game player within a predetermined time period wherein the size of the mark is increased with increase in a total of the number of operations.

18. A computer readable recording medium according to claim 17, wherein the technique setting program further comprises a step of changing the mark corresponding to the degree of difficulty through further operation of a third operable member.

19. A computer readable recording medium according to claim 17, wherein the technique setting program further comprises the step of causing the play character to land.

20. A computer readable recording medium according to claim 17, wherein the guiding is conducted in a command input area set in a partial area of the game screen image, and the series of commands is displayed in the input area in the form of icons.

21. A computer readable recording medium according to claim 17, wherein a higher evaluation is given as a shorter time is required to input the successive command inputs.

22. A computer readable recording medium according to claim 17, wherein, when the input of the successive command inputs is not completed within a predetermined time, the play character is caused to perform an action different from one performed when said successive command inputs are completed within the predetermined time.

23. A computer readable recording medium according to claim 17, wherein the play character is caused to perform a complicated technique when the set degree of difficulty is high.

24. A computer readable recording medium storing a technique setting program in a video game for displaying a play character in a game screen image displayed on a monitor and causing the play character to perform a plurality of techniques having different degrees of difficulty and prepared in advance by operating an operation unit, the technique setting program comprising the steps of:

changing a size of a mark in a manner corresponding to the degree of difficulty of a technique in response to a game player input;

setting a degree of difficulty of the technique to be performed by the play character in correspondence with the size of the mark;

guiding an inputting operation of a series of commands requiring corresponding successive command inputs by the game player for causing the play character to perform the technique corresponding to the set degree of difficulty, receiving said successive command inputs from a first operable member operated by the game player;

controlling the play character throughout the technique based on correspondence of said successive command inputs with said series of commands;

evaluating the technique performed by the play character in response to the inputting of the successive command inputs based on correspondence of said successive command inputs with said series of commands;

wherein the step of changing the size of the mark includes setting the size of said mark in response to a number of operations of a second operable member by the game player within a predetermined time period wherein the size of the mark is increased with increase in a total number of the number of operations;

setting a landing setting display area for setting the landing of the play character in a partial area of the game screen image;

setting a landing success zone in the landing setting display area;

displaying a landing mark which is movable;

enabling landing of the play character through operation of a fourth operable member provided in the operation unit when the landing mark is located within the landing success zone; and causing the play character to land.

25. A computer readable recording medium according to claim 24, wherein the landing success zone is set narrower as the degree of difficulty is set higher.

26. A video game device for displaying a play character on a game screen image displayed on a monitor and causing the play character to perform a plurality of techniques having different degrees of difficulty, comprising:
- a degree of difficulty setting unit for setting a degree of difficulty of a technique to be performed by the play character, said degree of difficulty setting unit including a mark changing unit for changing a size of a mark, said size of said mark being progressively increased in correspondence with a greater the degree of difficulty of the technique;
- a command setting unit for setting a series of commands in accordance with said set degree of difficulty, said series of commands requiring corresponding successive command inputs by the game player to guide the play character throughout the technique corresponding to the degree of difficulty set,
- a command guiding unit for guiding the game player, by displaying said series of commands, to input said successive command inputs for causing the play character to perform said technique corresponding to the set degree of difficulty,
- an operation unit for causing the play character to perform the technique according to the set degree of difficulty in accordance with said successive command inputs input by the game player throughout execution of said technique, the operation unit including:
  - a first operable member, operated by the game player, for inputting the successive command inputs in accordance with the said series of commands displayed by the command guiding unit, and
  - a second operable member, operated by the game player, for causing said mark changing unit to set the size of said mark in response to operations of said second operable member performed by the game player within a predetermined time period;
- an evaluating unit for evaluating the technique performed by the play character in accordance with the successive command inputs given by the first operable member.

27. A video game device for displaying a play character on a game screen image displayed on a monitor and causing the play character to perform a plurality of techniques having different degrees of difficulty, comprising:
- a degree of difficulty setting unit for setting a degree of difficulty of a technique to be performed by the play character, said degree of difficulty setting unit including a mark changing unit for changing a size of a mark, said size thereof corresponding to the degree of difficulty in such a manner that the larger the size thereof the higher the level of difficulty is;
- a command setting unit for setting a series of commands in accordance with said set degree of difficulty, said series of commands requiring corresponding successive command inputs by the game player to guide the play character throughout the technique corresponding to the degree of difficulty set;
- a command guiding unit for guiding the game player, by displaying said series of commands, to input said successive command inputs for causing the play character to perform said technique corresponding to the set degree of difficulty;
- an operation unit for causing the play character to perform the technique according to the set degree of difficulty in accordance with said successive command inputs input by the game player throughout execution of said technique, the operation unit including:
  - a first operable member, operated by the game player, for inputting the successive command inputs in accordance with the said series of commands displayed by the command guiding unit, and
  - an a second operable member, operated by the game player, for causing said mark changing unit to set the size of said mark in response to the operations thereof performed by the game player within a predetermined time period such that as a number of operations performed by the game player within the predetermined time period increases, the degree of difficulty set increases to a higher level; and
- an evaluating unit for evaluating the technique performed by the play character in accordance with the successive command inputs given by the first operable member.

* * * * *